(12) United States Patent
Wotton

(10) Patent No.: US 10,764,729 B2
(45) Date of Patent: Sep. 1, 2020

(54) COMMUNICATION SYSTEM USING VEHICLE TO VEHICLE RADIO AS AN ALTERNATE COMMUNICATION MEANS

(71) Applicant: Polaris Industries Inc., Medina, MN (US)

(72) Inventor: Geoffrey Wotton, Battle Ground, WA (US)

(73) Assignee: Polaris Industries Inc., Medina, MN (US)

( * ) Notice: Subject to any disclaimer, the term of this patent is extended or adjusted under 35 U.S.C. 154(b) by 72 days.

(21) Appl. No.: 16/217,450

(22) Filed: Dec. 12, 2018

(65) Prior Publication Data

US 2019/0200185 A1 Jun. 27, 2019

Related U.S. Application Data

(60) Provisional application No. 62/608,885, filed on Dec. 21, 2017.

(51) Int. Cl.
| | |
|---|---|
| *H04W 4/40* | (2018.01) |
| *H04L 5/00* | (2006.01) |
| *H04B 7/185* | (2006.01) |
| *H04W 4/02* | (2018.01) |
| *H04W 4/44* | (2018.01) |

(Continued)

(52) U.S. Cl.
CPC ............. *H04W 4/40* (2018.02); *G01S 5/0072* (2013.01); *H04B 7/185* (2013.01); *H04L 5/0055* (2013.01); *H04W 4/02* (2013.01); *H04W 4/023* (2013.01); *H04W 4/08* (2013.01); *H04W 4/44* (2018.02); *H04W 4/46* (2018.02); *H04W 48/12* (2013.01); *H04W 64/003* (2013.01); *H04W 72/0446* (2013.01); *H04W 72/1263* (2013.01)

(58) Field of Classification Search
CPC ........... H04W 4/40; H04W 4/46; H04W 4/33; H04W 4/02; H04W 4/023; H04W 4/08; H04W 48/12; H04W 64/003; H04W 72/0446; H04W 72/1263; G01S 5/0072; H04B 7/185; H04L 5/0055
See application file for complete search history.

(56) References Cited

U.S. PATENT DOCUMENTS

| | | |
|---|---|---|
| 5,732,359 A | 3/1998 | Baranowsky, II et al. |
| 8,744,417 B2 | 6/2014 | Adler et al. |

(Continued)

FOREIGN PATENT DOCUMENTS

| | | |
|---|---|---|
| WO | WO-2014051473 A1 | 4/2014 |
| WO | WO-2017/0209666 A1 | 12/2017 |

OTHER PUBLICATIONS

Partial International Search for International Application PCT/US2018/065973 dated Apr. 4, 2019.

(Continued)

*Primary Examiner* — Duc C Ho
(74) *Attorney, Agent, or Firm* — Harness Dickey

(57) ABSTRACT

A system and method of operating the same includes a first radio of a vehicle generating a first communication signal. The first radio attempts to communicate the first communication signal through a first communication system other than a vehicle to vehicle radio. The first radio, when an acknowledgement signal is not received, communicates the first communication signal though the vehicle to vehicle radio to a second vehicle radio.

18 Claims, 34 Drawing Sheets

FIG. 28

(51) Int. Cl.

| | |
|---|---|
| *H04W 4/46* | (2018.01) |
| *G01S 5/00* | (2006.01) |
| *H04W 4/08* | (2009.01) |
| *H04W 64/00* | (2009.01) |
| *H04W 48/12* | (2009.01) |
| *H04W 72/04* | (2009.01) |
| *H04W 72/12* | (2009.01) |

(56) References Cited

U.S. PATENT DOCUMENTS

| | | | |
|---|---|---|---|
| 9,466,156 B2 | 10/2016 | Getchius | |
| 9,501,920 B2 | 11/2016 | Harring et al. | |
| 9,820,113 B2 | 11/2017 | Klang et al. | |
| 2002/0120394 A1 | 8/2002 | Rayne | |
| 2005/0233789 A1 | 10/2005 | Maekawa | |
| 2007/0150140 A1 | 6/2007 | Seymour | |
| 2008/0084852 A1 | 4/2008 | Karschnia | |
| 2009/0122738 A1 | 5/2009 | Chen et al. | |
| 2010/0177718 A1 | 7/2010 | Harle et al. | |
| 2011/0149958 A1 | 6/2011 | Jeon et al. | |
| 2013/0279393 A1 | 10/2013 | Rubin et al. | |
| 2016/0029197 A1* | 1/2016 | Gellens | H04Q 9/00 |
| | | | 455/404.1 |
| 2016/0198315 A1 | 7/2016 | Sakata | |
| 2017/0195038 A1* | 7/2017 | Sham | H04W 72/04 |
| 2017/0230795 A1 | 8/2017 | Rentz et al. | |
| 2017/0243485 A1 | 8/2017 | Rubin et al. | |
| 2017/0302774 A1 | 10/2017 | Lei et al. | |
| 2018/0270831 A1* | 9/2018 | Meredith | H04W 4/40 |
| 2019/0141603 A1 | 5/2019 | Vulgarakis Feljan et al. | |
| 2019/0208492 A1 | 7/2019 | Maruta et al. | |

OTHER PUBLICATIONS

Office Action regarding U.S. Appl. No. 16/217,418, dated Aug. 9, 2019.

International Search Report and Written Opinion for international application PCT/US2018/065973, dated May 20, 2019.

U.S. Appl. No. 16/217,270, filed Dec. 12, 2018, Elgee et al.

U.S. Appl. No. 16/217,379, filed Dec. 12, 2018, Puckette et al.

U.S. Appl. No. 16/217,418, filed Dec. 12, 2018, Wotton.

* cited by examiner

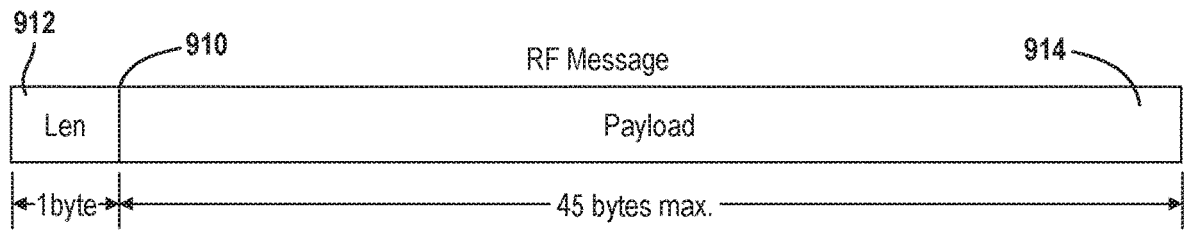

FIG. 9

Long Range (Slow Pipe)
Nominal Data Rate: 1563bps
Message Length: 46 bytes total — 1010

| Max Users Allowed | Bits/user/sec | Latency (sec) |
|---|---|---|
| 2 | 92 | 4 |
| 5 | 36.8 | 10 |
| 10 | 18.4 | 20 |
| 20 | 9.2 | 40 |

Message Duration: 382ms

Short Range (Fast Pipe)
Nominal Data Rate: 4688bps
Message Length: 46 bytes total — 1012

| Max Users Allowed | Bits/user/sec | Latency (sec) |
|---|---|---|
| 2 | 920 | 0.4 |
| 5 | 368 | 1 |
| 10 | 184 | 2 |
| 20 | 92 | 4 |

Message Duration: 101ms

Beacon Signal
Nominal Data Rate: 4688bps
Message Length: 46 bytes total + 278 Symbols of Preamble
Bits/sec: 92
Message Duration: 380ms
Message Latency: 2 sec

FIG. 10

| Max Nodes Allowed | Time Slots per Node per Frame |
|---|---|
| 2 | 5 |
| 5 | 2 |
| 10 | 1 |
| 20 | 0.5 |

|        | Tx Events in 2 RF Frames |      |        |
|--------|--------------------------|------|--------|
| Nodes  | Slow                     | Fast | Beacon |
| 2      | 10                       | 100  | 20     |
| 5      | 4                        | 40   | 20     |
| 10     | 2                        | 20   | 10     |
| 20     | 1                        | 10   | 20     |

FIG. 21A

|        | Tx Events in 1 RF Frames |      |
|--------|--------------------------|------|
| Nodes  | Master                   | Node |
| 2      | 65                       | 55   |
| 5      | 32                       | 22   |
| 10     | 21                       | 11   |
| 20     | 15.5                     | 5.5  |

FIG. 21B

COMMUNICATION SYSTEM USING VEHICLE TO VEHICLE RADIO AS AN ALTERNATE COMMUNICATION MEANS

RELATED APPLICATION

This application is a non-provisional application of provisional application 62/608,885, filed Dec. 21, 2017, the disclosure of which is incorporated by reference herein.

FIELD

The present disclosure relates to a radio to radio communication and, more particularly, to a method and system for providing a vehicle to vehicle radio as alternate communication means.

BACKGROUND

This section provides background information related to the present disclosure which is not necessarily prior art.

Recreational vehicles such as snowmobiles, four-wheelers, all-terrain vehicles, motorcycles and the like are used in various places under various conditions. Many places where such vehicles are used do not have access to or have limited access to cell service.

It is desirable for recreational vehicles to intercommunicate various types of data therebetween. For example, systems are available that allow two-way communications between various vehicles. Such systems often include the use of cell towers for intercommunication. However, as mentioned above, cellular communication is not available under many circumstances.

Communication using satellites is also possible. However, satellite communications require a clear view of the sky. Satellite communications in geographic regions that are thickly forested may be encumbered by trees. Also, traversing canyons can also provide difficulty in inter-vehicle communication using satellites.

Communicating directly between vehicles is often difficult. In a popular area, many vehicles may be trying to communicate. The vehicle radios may interfere with each other and thus communications may be difficult.

SUMMARY

This section provides a general summary of the disclosures, and is not a comprehensive disclosure of its full scope or all of its features.

The present disclosure provides a vehicle-to-vehicle communication system that increases the likelihood of unencumbered communications directly between vehicles. A protocol is established to allow the vehicles to intercommunicate.

In one aspect of the disclosure, a system includes a first radio of a vehicle generating a first communication signal. The first radio attempts to communicate the first communication signal through a first communication system other than a vehicle to vehicle radio. The first radio, when an acknowledgement signal is not received, communicates the first communication signal though the vehicle to vehicle radio to a second vehicle radio.

In another aspect of the disclosure, a method includes generating a first communication signal at a first radio of a first vehicle, attempting to communicate the first communication signal through a first communication system other than a vehicle to vehicle radio and, when an acknowledgement signal is not received at the first radio, communicating the first communication signal though the vehicle to vehicle radio to a second vehicle radio.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a diagrammatic representation of an RF message.

FIG. 10 is a chart of long range and short range data.

FIG. 21A is a table of transmitting events per frame.

FIG. 21B is a table of transmitting events in two RF frames.

Corresponding reference numerals indicate corresponding parts throughout the several views of the drawings.

DETAILED DESCRIPTION

Example embodiments will now be described more fully with reference to the accompanying drawings. Although the following description includes several examples of a radio, it is understood that the features herein may be applied to any appropriate radio, such as snowmobiles, motorcycles, all-terrain radios, utility radios, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
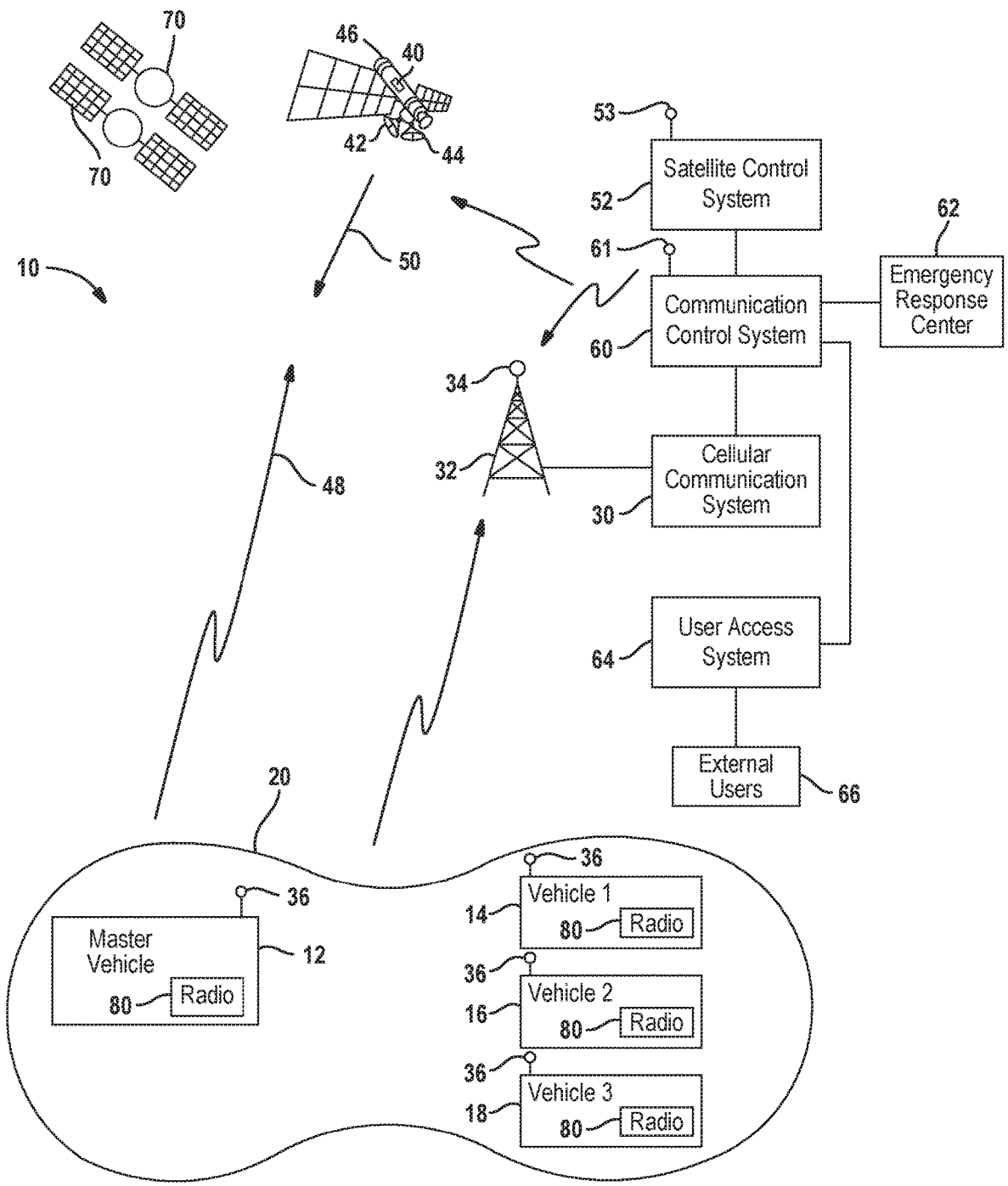
FIG. 1 is a diagrammatic view of the system according to the present disclosure.

Referring now to FIG. 1, a communication system 10 is illustrated for communicating between vehicles. In this example, a master vehicle 12, a first vehicle 14, a second vehicle 16 and a third vehicle 18 are illustrated in a group 20. The group 20 may be formed according to the teachings set forth below. The master vehicle 12 may be the leader of the group that controls the formation of the group. Although in some examples, vehicles in the group may not have a master or group leader. As will be further described below, the master vehicle 12 may form the group and, if the master vehicle 12 leaves the group, the group may continue to be maintained between the various other vehicles 14-18. Depending on design consideration no further group members may be allowed to join. However, in some examples other group members may join after a master leaves the group. Another vehicle may also be assigned to the master radio position such as the radio in the first timeslot. Once assigned as the master the first radio may generate the beacons. In other examples, all vehicles within a group may generate beacons.

The vehicles 12-18 may communicate using various types of communication systems. One example of a communication system is a terrestrial communication system such as a cellular communication system 30. The cellular communication system 30 may include a plurality of cell towers, one cell tower 32 is illustrated for simplicity. The cell tower 32 may include an antenna 34 disposed thereon. The antenna 34 may be in communication with the antennas 36 disposed on the vehicles 12-18.

Another example of a communication system is an extra-terrestrial communication such as a satellite 40. The satellite 40 may be a single satellite such as a geostationary satellite or a constellation of satellites such as low earth orbit satellites or middle earth orbit satellites. The satellite 40 includes a receiving antenna 42 and a transmitting antenna 44. A bent pipe transponder 46 may be used for relaying communication signals between one of the vehicles 12-18 and a satellite control system 52. That is, the vehicles may generate uplinks 48 which are communicated to the receiving antenna 42. The satellite antenna 44 may also generate a downlink 50 to the vehicles 12-18.

The satellite control system 52 may control the telemetry, tracking and control of the satellite 40 through the antenna 53. The satellite control system 52 may also control the communication signals that are communicated to and from the satellite 40.

A communication control system 60 may be used to control the communications between the vehicles 12-18 and the satellite control system 52 or the cell communication system 30 when such systems are used. Such signals may include emergency type signals which may be dispatched from the control system 60 to an emergency response center 62. An antenna 61 may be used for wireless communication from the communication control system 60.

A user access system 64 may be in communication with a communication control system 60. The user access system 64 may allow external users 66 such as non-vehicle operators to communicate with the vehicle systems or monitor the data associated with the various vehicles 12-18 such as their positions.

The position of the vehicles 12-18 may be determined using GPS satellites 70. The signals generated by the GPS satellites 70 may be used by the vehicles 12-18 to determine a position of the vehicle. Determine a vehicle position may include the latitude and longitude of the vehicle which is determined in a conventional manner.

Each vehicle 12-18 may include a radio 80. The word radio means a wireless communicator. The radio 80 may be used to wirelessly communicate though a plurality of different types of systems such as but not limited to a vehicle to vehicle, satellite and cellular systems. Although communication between vehicles was described above, the communication is between the radios within or connected to the vehicles. The radio 80 may be a vehicle-to-vehicle radio that is used for communicating various types of data between the vehicles 12-18. As will be described below, a vehicle identifier and position may be communicated. However, various other types of data including vehicle-to-vehicle messages may also be exchanged between the radios 80. The vehicle radios 80 are direct communication radios that do not require the use of communication through a cell communication system 30 or through the satellite control system 52. As will be further described below, the vehicle-to-vehicle radio 80 may be a primary source of intercommunication which is backed up by the cellular communication system 30 and/or the satellite 40. The radio 80 may also act as the satellite 40 or the cellular communication system 30. Also, as described below, the cellular communication system 30 may act as a backup for the satellite 40. The vehicle-to-vehicle radio 80 may act as a backup to the cellular communication system 30.

Figure 2:
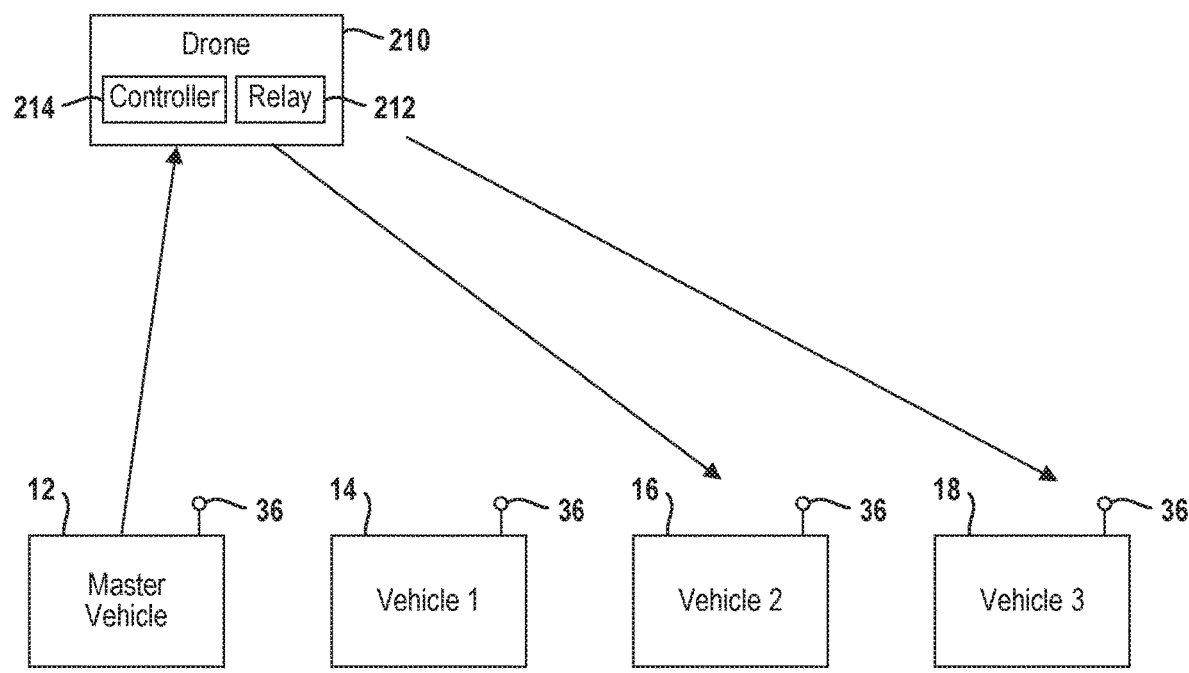
FIG. 2 is a diagrammatic view of the use of a drone for relaying data between various vehicles.

Referring now to FIG. 2, the radios of the vehicles 12-18 may also intercommunicate through a drone 210. The drone 210 may include a relay 212 that is used for communicating content from each vehicle to other vehicles located in the area. The drone 212 may act as an extension of the antenna 36 located on the master vehicle. A controller 214 may control the flight characteristics and the relay of signals to and from the master vehicle 12 from the vehicles 14, 16 and 18. The drone 210 may thus act as an antenna for the master vehicle 12. The relay is particularly suitable for expanding the area for intercommunication between the vehicles 12-18.

Figure 3:
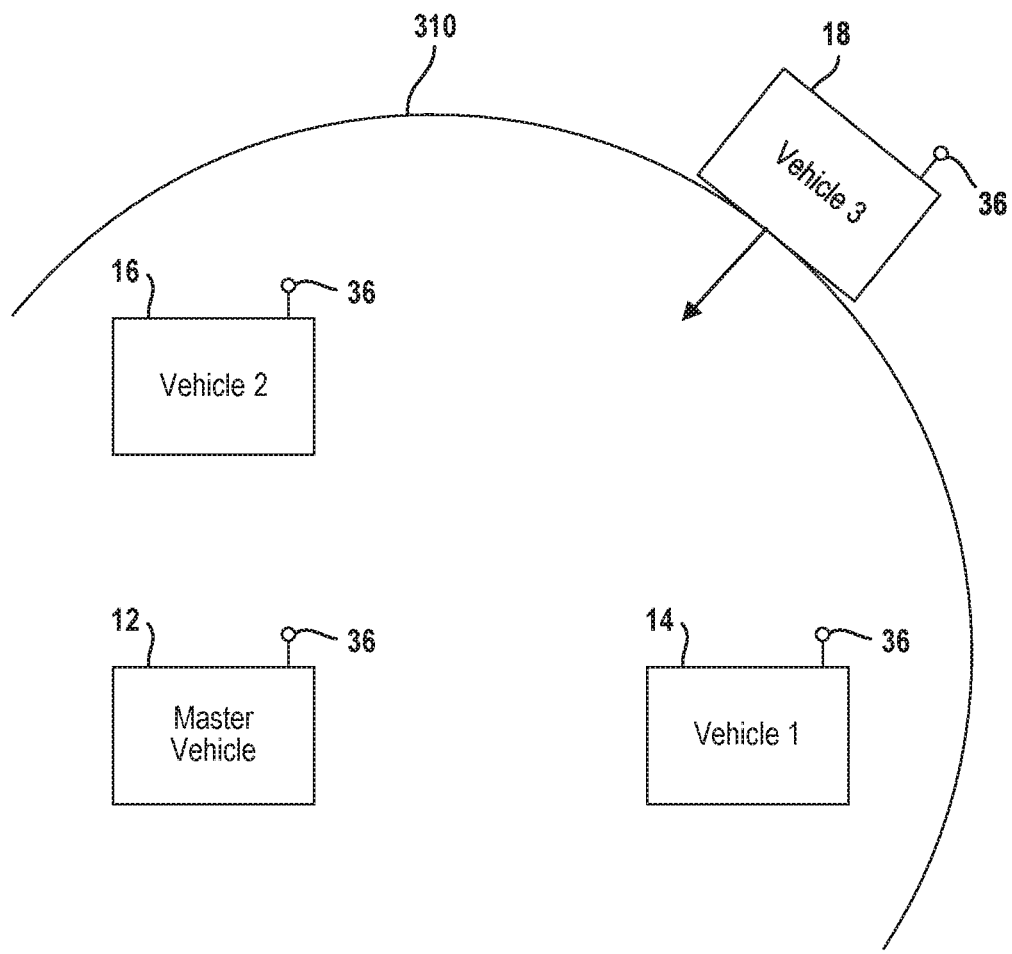
FIG. 3 is a diagrammatic view of a third vehicle entering a group of two vehicles and a master vehicle.

Referring now to FIG. 3, the vehicles 12-18 are illustrated within a boundary 310. The boundary 310 represents a distance from the master vehicle 12. The third vehicle 18 is entering the boundary 310. The first vehicle 14, the second vehicle 16 and the master vehicle 12 have already formed a group. The third vehicle 18 is entering the boundary. A group may be automatically formed by any vehicle entering a predetermined boundary so that the vehicle can intercommunicate with the other vehicles in a group for safety purposes. The third vehicle 18 may be assigned a timeslot when a predetermined distance is determined from a vehicle. That is, the distance or global position of the master vehicle is determined. The position of the third vehicle 18 also determined. When the master vehicle determines that the third vehicle 18 is within the boundary 310, a timeslot for communicating with the other vehicles 12-16 is provided. The position of all the vehicles within the group may be provided to the groups so the safety of the riders or vehicle operators may be improved.

Figure 4A:
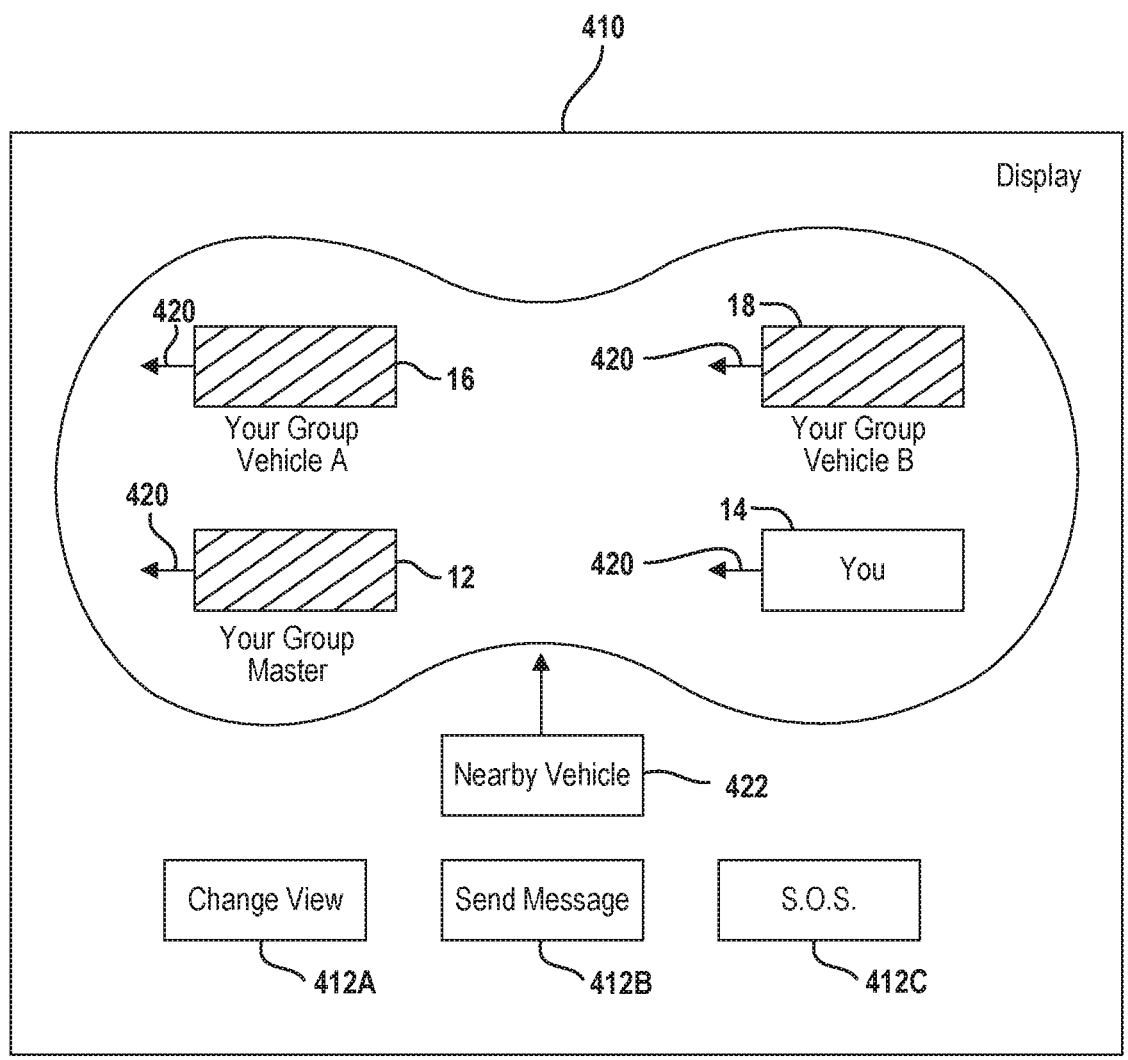
FIG. 4A is a diagrammatic view of a screen display.

Referring now to FIG. 4A, each of the vehicles 12-18 illustrated in FIGS. 1-3 may include a screen display 410. The screen display 410 may be associated with control buttons 412A-412C. The control buttons may be used to control various functions of the display 410. The display 410 is illustrated for the group formed in FIG. 3 after the vehicle 18 joins the group. In this example, the display 410 corresponds to the display of the vehicle 14 and is labeled "you." The relative positions of each of the other vehicles 12, 16 and 18 are also set forth. The direction or relative headings 420 of each of the vehicles are labeled.

A nearby vehicle 422 may also be displayed. The nearby vehicle 422 may be a vehicle not yet within the group. That is, data from the group or data to the group besides a vehicle position may not be exchanged between nearby vehicle 422 and vehicles 12-18.

The buttons 412A-412C may be discrete buttons adjacent to the screen display 410 or may be touch screen display buttons displayed at the bottom of the screen. In this example, button 412A corresponds to a "changed view" button which may change the view of the vehicles to a different type of view or a high level view on a map. Button 412B may be an interface to allow a message to be sent. Button 412C may be an SOS button that sends a signal to the other vehicles, notifying them that the present vehicle is in need of help. Various numbers of buttons may be used. The number of buttons may change as the screen changes by the use of touch screen buttons.

Figure 4B:
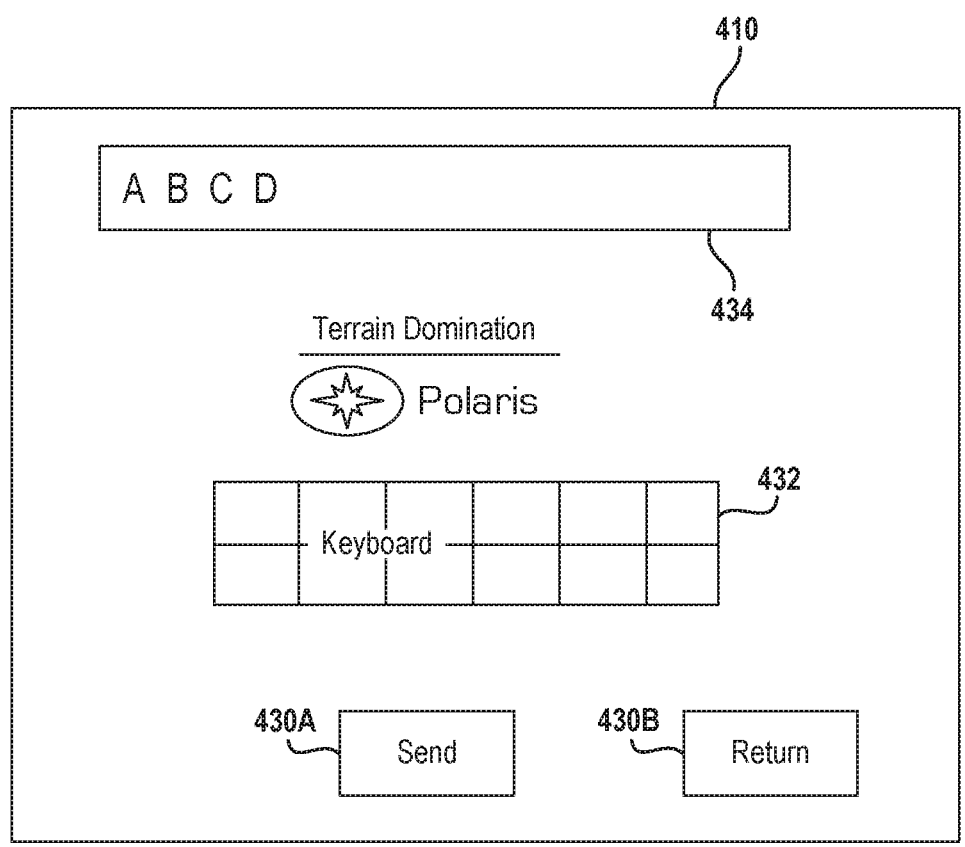
FIG. 4B is a diagrammatic view of a screen display for entering messages.

Referring now to FIG. 4B, the screen display 410 is reached after depressing the button 412. In this example, new buttons 430A and 430B are illustrated. Button 430A corresponds to a send button for sending the message display. Button 430B returns to a previous screen. In this example, a keyboard 432 is used for typing messages within a message indicator portion 434 of the screen display 410. Of course, the keyboard 432 may be a touch screen keyboard with various letters and numbers for generating the messages which may be sent by the vehicle radio associated with the display 410. Voice control may also be used for generating messages as well.

Figure 5:
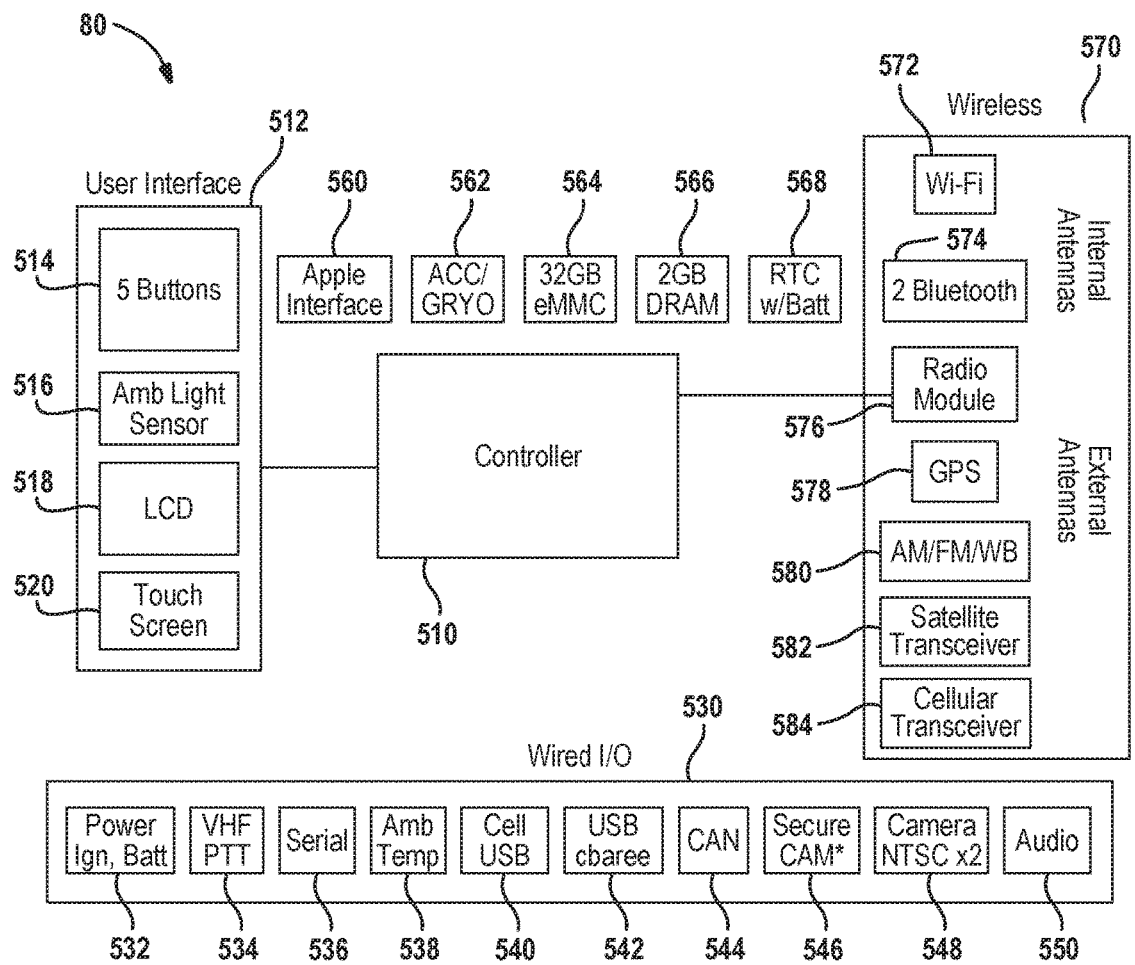
FIG. 5 is block diagrammatic view of a radio according to the present disclosure.

Referring now to FIG. 5, a block diagrammatic view of the radio 80 for the vehicles is set forth. The system has a controller 510 that is formed using one or more microprocessors. The controller 510 is coupled to a user interface 512. The user interface 512 may be one or more different types of user interfaces that act alone or together to allow the user to input various commands or control the radio. In this example, five buttons 514 are used for various functions such as dimming the backlight and controlling various functions on the screen. The user interface 512 may also include an ambient light sensor 516 for dimming or brightening the display depending on the conditions around the radio. The ambient light sensor 516 generates an ambient light signal corresponding to the amount of light received at the sensor 516.

The user interface 512 may also include a liquid crystal display (LCD) 518. The liquid crystal display 518 may be used to display various menus and displays such as the display 410 illustrated above. The LCD display 518 may be backlit and have high resolution to provide various types of data and interfaces therein.

The user interface 512 may also include a touch screen 520. The touch screen 520 may react to touch and gestures such as sliding gestures across the screen thereof. The touch screen display 520 may use projective capacitive technology to sense a touch and gestures upon the surface thereof.

The controller 510 may also be coupled to a wired input/output (I/O) 530. The modules set forth in the wired I/O 530 include a power source 532 such as the vehicle battery or an ignition signal that is powered when the ignition of the vehicle is operating. The wired I/O 530 may also include a VHF push-to-talk module 534. The VHF push-to-talk module may allow voice communication directly between various vehicle radios.

A serial module 536 may provide the controller 510 a means for serial communication external to or within the vehicle.

An ambient air temperature sensor 538 may be used to provide the ambient air temperature to the controller 510. A cellular USB module 540 allows a wired USB connection between the controller 510 and the originating device such as a cellular phone.

A USB charge port 542 may also be provided in communication with the controller 510. The USB charge port 542 may be a port used to receive or transmit content to or from a mobile phone. USB charge port 542 may also provide enough current to charge a cellular phone.

A controller area network (CAN) 544 may be provided. The various devices or modules set forth within the radio may communicate with the controller area network. The controller area network 544 may also communicate with other sensors and actuators within the vehicle.

A secure car area network 546 may also be included within the system. The secure controller area network 546 may allow secure connections between the various devices within the vehicles.

The controller 510 may also be coupled to a camera 548. The camera 548 may be an NTSC camera. Of course, one or more cameras 548 may be incorporated into the system.

The wired I/O 530 may also include an audio input/output module 550. The I/O module 550 may generate various output signals that correspond to audio output. In this example, the audio module 550 may provide various numbers of outputs including six outputs. The controller may also receive inbound audio signals through a jack or connector. The present disclosure has two audio inputs.

The controller 510 may also be coupled to the Apple interface 560. The Apple interface 560 may allow the vehicle to intercommunicate with an Apple® device.

An accelerator/gyrometer 562 may also be used by the controller 510 for providing data regarding the state of the vehicle. For example, the accelerator/gyrometer 562 may provide various rotational moments and accelerometers in various directions.

The controller 510 may also be coupled to various types of memory including an eMMC memory 564. The eMMC memory 564 is an embedded multi-media controller memory that comprises both a flash memory and a controller embedded therein for controlling the flash memory.

Another memory associated with the controller 510 is a dynamic random access memory (DRAM) 566. The dynamic random access memory 566 may be used for storing the program code for the processor functions.

A real-time clock 568 may also be coupled to the controller 510. The real-time clock 568 may include a battery to maintain the time therein. The real-time clock 568 may be set to function or synchronize with a global positioning system.

A wireless module 570 may include a WiFi module 572 for coupling to WiFi. The wireless module 570 may also include a Bluetooth interface 574. In this example, two Bluetooth interfaces 574 are provided. A radio module 576 may also be provided within the wireless module 570. The radio module 576 may provide vehicle-to-vehicle radio functions controlled in part by the controller 510. The radio module 576 will be described in further detail below.

The wireless module 570 may also include a global positioning system interface 578. The global position system interface 578 may interface with the global satellite system and relay the signals to the controller 510 or may determine from the signals within the global positioning system module 578 the position of the vehicle.

The wireless module 570 may also include an AM/FM/weather band (WB) interface for interfacing with the AM, FM and weather band of over-the-air broadcasts. The AM/FM/weather band module 580 may couple with the speakers for audibly displaying various signals thereon.

The wireless module 570 may be controlled by the controller 510 in response to various responses from the user interface 512. That is, the various portions of the user interface 512 may be communicated to the controller 510 to allow the various other portions associated with the radio to communicate thereto. The wireless module may control both inbound and outbound data and messages for the radio 80.

The wireless module 570 also may include a satellite transceiver 582. The satellite transceiver 582 is used for receiving signals from a satellite. In certain examples, the satellite transceiver may also be used to transmit signals to a satellite.

A cellular transceiver 584 may also be part of the wireless module 570. The cellular transceiver 584 may be used to transmit and receive signals from the cellular communication system 30. The cellular system 30 may be an LTE system or other types of wireless technology.

Figure 6:
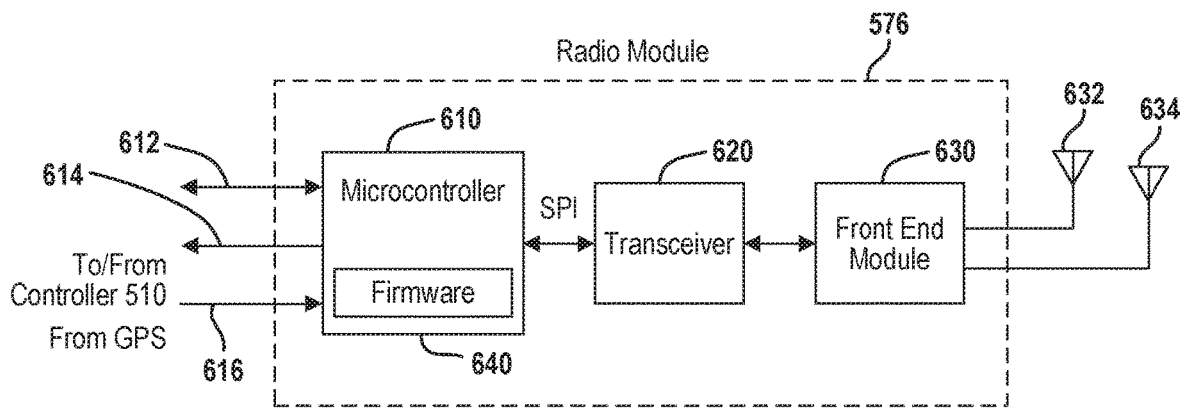
FIG. 6 is a detailed block diagrammatic view of a radio module according to the present disclosure.

Referring now to FIG. 6, the radio module 576 is illustrated in further detail. The controller 610 includes a serial peripheral interface 612, an interrupt output 614 and a GPS input 616. The serial peripheral interface 612 exchanges signals between the controller 510 and the controller 610. The serial peripheral interface 612 is used both to transmit and receive messages. The serial peripheral interface 612 receives configuration signals and received messaging signals from the controller 510. The interrupt output 614 generates interrupts that are communicated to the controller 510 for various control functions.

The GPS input 616 receives one pulse per second signals from the GPS system. The GPS signals represent signals from a satellite and together with the timing may be used to triangulate a position of the radio/vehicle.

The controller 610 is in communication with a transceiver 620 through a serial port interface 622. The transceiver 620 is used to transmit and receive radio signals from the front end module 630. The front end module 630 is used to amplify the signals received and transmitted from the receiving antenna 632 and to the transmitting antenna 634. The radio module 576 may be used for vehicle communication.

The controller 610 includes firmware 640 for controlling the functions of the radio including timing of the signals, queuing of the signals and the exchange of signals between the transceiver 620 and the controller 510.

Figure 7:
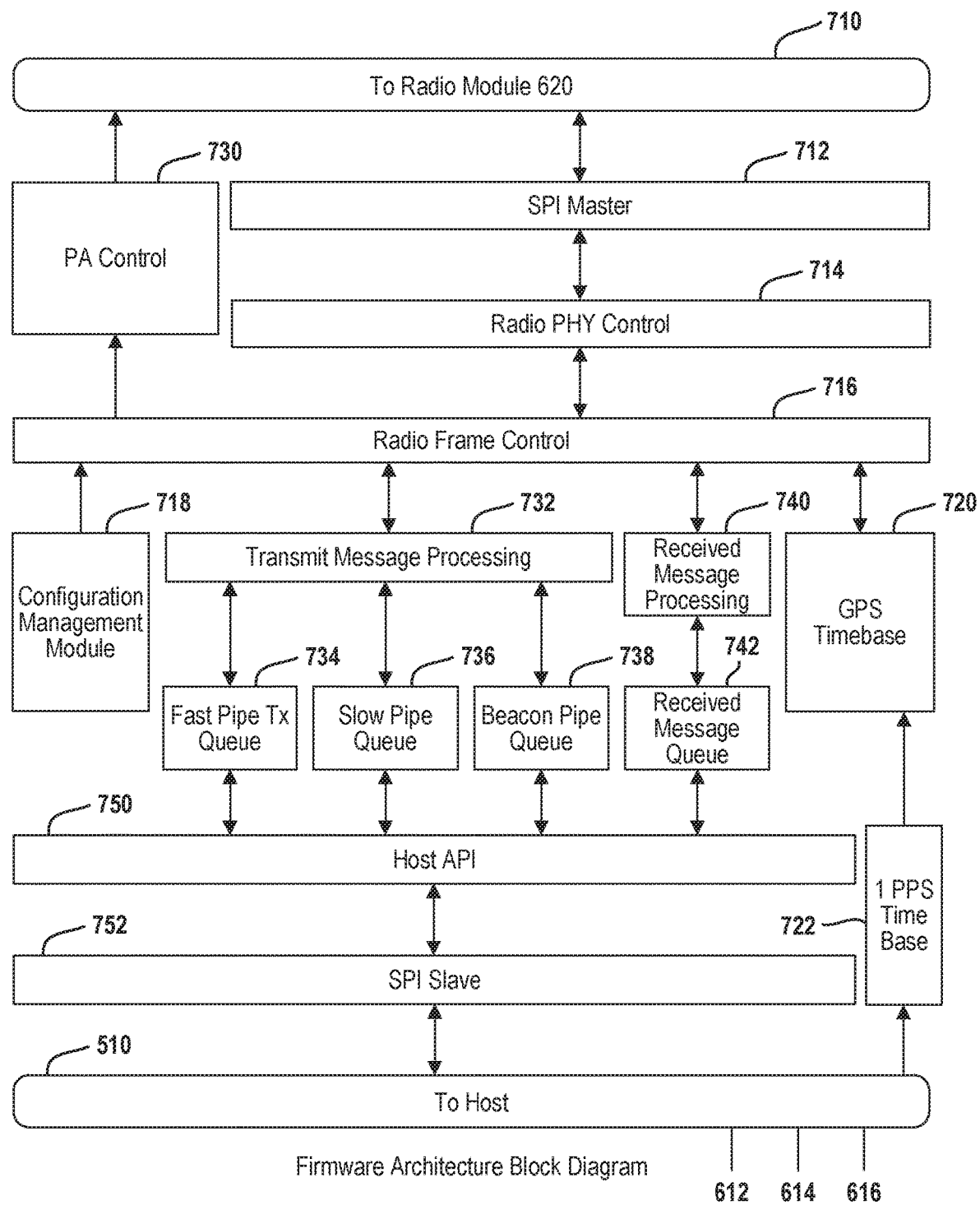
FIG. 7 is a block diagram of the firmware architecture of the radio module 576.

Referring now to FIG. 7, the firmware 640 for the controller 610 is set forth. In this example, the interface 710 is in communication with the serial radio module 620. Interface 710 is in communication with a serial peripheral interface master 712. The serial peripheral interface master 712 is in communication between the interface 710 and the radio physical (PHY) control module 714. The SPI master 712 is the driver that enables communication to the physical radio control module 714 to control and configure the radio as well as transmit and receive messaging therefrom. The radio physical control module 714 is in communication with a radio frame control module 716. The radio frame control module 716 manages the frame timing of the radio link. It uses a mixture of timing parameters and configurable parameters that are maintained by a configuration management block module 718. The timing of the radio control module for the radio frame control module 716 is globally timed between all of the radio modules by way of the 1 PPS from the GPS time-based module 720. The time-based module 720 receives the GPS signal 722 through the time-based module 720.

The radio frame control module 716 is in communication with the power amplifier control block 730. The power amplifier control block 730 controls the front end module 630 to select the appropriate antenna that is used for communicating the transmit output power.

A transmit message processing module 732 coordinates acquiring the next message to send from the appropriate transmit queue based upon the appropriate frame timing. The transmit message processing module 732 is in communication with a fast pipe transmit queue 734, a slow pipe queue 736, and a beacon pipe queue 738.

A received message processing module 740 handles received messages that are received at the radio module 576. The messages may be frame checked, validated and a wrapper added to indicate where in the frame the message was received. The valid messages are then placed in the received message queue 742. By knowing where in the frame that the message was received, the originating radio module or node may be determined therefrom. A host application interface 750 processes the received host messages and either forwards data or dispatches actions to the various blocks within the system. The host API module 750 is in communication with the configuration management module 718, the fast pipe transmit queue 734, the slow pipe queue 736, the beacon pipe queue 738 and the received message queue 742. The host API module 750 may also be in communication with the GPS time-based module 720. The host API module 750 also retrieves and forwards messages from the queues mentioned above. The host API module 750 is also in communication with the SPI slave module 752. The SPI slave module enables the transmission and reception of messages to and from the host 510 and, more particularly, to the serial peripheral interface, the interrupt output 614 and the GPS unit 616. The radio module 576 acts as an SPI slave device.

The configuration management module 718 maintains the configurable radio parameters which are both persistent and non-persistent. The configuration management module 718 also performs frame timing, RF frequency selection and the group number and associated data. The configuration management module 718 also maintains the frequencies for the frequency hopping as will be further described below.

Figure 8:
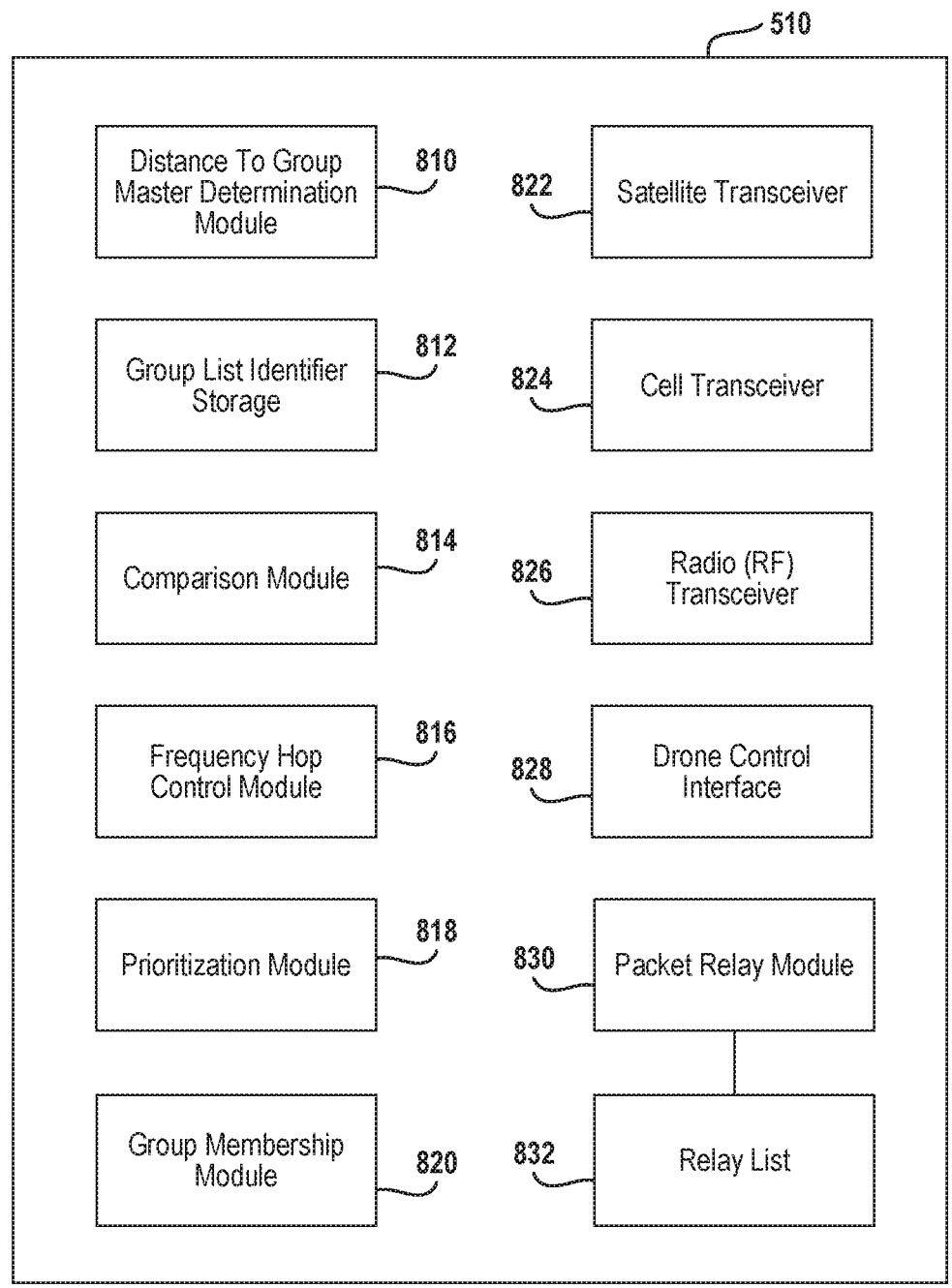
FIG. 8 is a block diagrammatic view of the control module 510.

Referring now to FIG. 8, details of the controller 510 are illustrated in further detail. The host 510 may be used to perform various functions as set forth in the modules below. The controller 510 may be used to perform various master functions. All of the radios in a group may have the capability to act as a master radio. However, once a master or leader is chosen as described before, the master is maintained until the group terminates. In block 810, a distance module is used to determine the distance to a group. The distance to group master determination module 810 receives the GPS coordinates of the vehicles within the group. When a vehicle joins the group within a predetermined distance, the joining radio may join the group as will be described below. In block 812, a group list identifier storage module maintains a list of the radios within a radio group.

A comparison module 814 is used to compare the distances of nearby radios to the master radio. The distance may be used to allow entry into a group.

The frequency hop control module 816 controls the frequency hopping for the radios. That is, the group may all simultaneously frequency hop so that intercommunication takes place. The frequency hopping will be described in further detail below.

A prioritization module 818 is used to prioritize various signals. For example, an SOS signal or an emergency vehicle signal may have priority over various other types of communication signals. A group membership module 820 may be used to identify nodes for the various radios within the group. Each node is assigned a timeslot for communication.

A satellite transceiver 822 may also be included within the control module 510. The satellite transceiver module 822 may communication both to and from a satellite.

A cellular transceiver module 824 transmits and receives signals from a cell tower antenna.

A radio transceiver module 826 sends and receives signals from one or more radios. A drone control interface 828 controls a drone. That is, both communication signals pass through a drone and the location of a drone may be controlled using the drone control interface 828. It should be noted that not all of the transceivers are required for a communication system. For example, the satellite transceiver 822 or the cellular transceiver module 824 may easily by eliminated. However, the RF transceiver 826 may also be a backup for the satellite transceiver 822 and the cellular transceiver 824. Details of the various modules set forth in FIG. 8 will be described in more detail below.

The control module 510 may also include a packet relay module 830. A relay list 832 is in communication with the packet relay module 830. The packet relay module 830 maintains the relay list 832. The packet relay module recognizes that each node or radio in a group has a limited radio range within which it can communicate to and from other nodes. Due to spatial diversity, the nodes may be split into two different groups. However, as long as there is a subset of nodes that can communicate, the nodes can form a path to other nodes indirectly and therefore a means for connecting in-range and out of range nodes is possible. The relay list 832 is a list of the nodes and the communication aspects between the nodes. That is, some nodes may be active, some nodes may be inactive, and some nodes may be relayed. The packet relay module 830 is an array of nodes states which may be communicated to other nodes as regular updates. The details of this will be described in greater detail below.

Referring now to FIG. 9, a diagrammatic view of the RF message format is set forth. An RF message 910 is illustrated having a length portion 912 and a payload portion 914. The length portion 912 may provide an indication as to the length of the payload 914. The length portion 912 may be one byte and the payload portion may be a maximum portion of 45 bytes in this example. A length of zero may indicate a host message. A length of one may indicate a radio message. The most significant bit of the length may be used to define the destination of the message. A message type and cyclical redundancy check may be provided within the radio hardware as may be described in more detail below. The RF message 910 applies to messages that are communicated through the fast pipe transmit queue 734, the slow pipe queue 736 and the beacon pipe queue 738. The slow pipe queue 736 may be referred to as a long range queue whereas the fast pipe may be referred to as a short range queue.

Referring now to FIG. 10, the long range (slow pipe) communication chart for a constricted radio is set forth. The charts illustrated in FIG. 10 have the long range nominal data rate is 1563 bytes per second with each message length being a maximum of 45 bytes total. Chart 1010 illustrates the maximum users allowed, the bits per user per second and the latency when the maximum amount of users allowed changes. The first row has two maximum allowed users which allows 92 bits per user per second and a latency speed of 4 seconds. When the maximum amount of users allowed is 5, the bits per user per second is 36.8 and the latency is approximately 10 seconds. When the maximum amount of users allowed is 10, the bits per user per second is 18.4 and the latency is 20 seconds. When the maximum users allowed is 20, the bits per user per second are 9.2 and the latency is 40 seconds. Each message duration may be 382 milliseconds.

The overall radio parameters may have the RF bandwidth being 62.5 kilohertz. A spreading factor of 8 long range, 6 short range and 6 beacon intervals are set. The transmit may be 30 dBm or 1 watt. Fifty-three of a possible 257 possible RF channels may be used. A plurality of hop tables may also be used. 256 hop tables with a maximum devolved time of 400 milliseconds may be used. The system may use time division multiple access.

Frequency hop spread spectrum operation may be performed between 902 and 928 megahertz. In table 1012, one of the examples of the short range characteristics of the communicating radios is set forth. In the short range radio, the nominal data rate in this example is 4688 bps. The message length is approximately 46 bytes. As mentioned above, each of the short range, long range and beacon signals may be 46 bytes total maximum. In this example and as will be described below, more data may be communicated in a short range. In this example, when two users are allowed, 920 bits per second may be communicated with the latency of 2.4 seconds. This is ten times faster than that of the long range signal of table 1010. When five maximum users are allowed, 368 bits per second per user may be communicated with the latency of one second. When a maximum amount of users allowed is ten, the bits per user per second is 184 and the latency is two seconds. When the maximum amount of users is 20, the bits per user per second is 92 and the latency is four seconds. The message duration of the short range signal is 101 milliseconds.

With respect to the beacon signal, a nominal data rate of 4688 bits per second is set forth. As mentioned above, the message length may be 46 bytes total but the beacon may have 278 symbols of preamble therein. 92 bits may be communicated per second with the beacon signal wherein the message duration is 380 milliseconds with a message latency of two seconds.

By using time deviation multiple access (TDMA), a contention-free access system be used. A dedicated bandwidth per node is provided and deterministic latencies ensure sufficient and predictable communication for both the fast pipe and the slow pipe as will be described below.

Figures 11, 12:
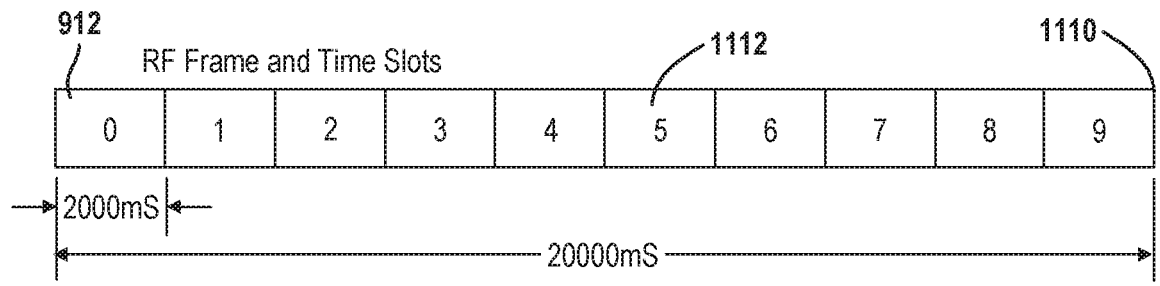
FIG. 11 is a diagrammatic view of an RF frame having timeslots.
FIG. 12 is a chart of the maximum nodes allowed versus timeslot distribution.

Referring now to FIG. 11, in the present example, a frame 1110 is divided into ten timeslots 1112 when the maximum amount of allowed users is 10. In this example, each frame is 20 seconds or 20,000 milliseconds. Each timeslot 1112 is 2,000 milliseconds. Therefore, there are three frames per minutes. Each radio module or node is assigned a number within a group. Depending on the number of members in the group, as illustrated above in FIG. 10, each node may be assigned a whole timeslot, multiple timeslots or fractional timeslots to optimize the data transfer. The timeslots are numbered at the start of a minute by the following equation: INT((sec/2)%10).

Referring now to FIG. 12, a distribution of the number of timeslots as a function of group size is set forth. In the following example, the maximum nodes allowed in the first row is 2. Therefore, the number of timeslots per node per frame is 5. When the maximum number of nodes allowed is 5, the number of timeslots per node per frame is 2. When the maximum amount of nodes allowed is 10, the number of timeslots per node per frame is 1. When the maximum amount of nodes allowed is 20, 0.5 timeslots per node per frame is illustrated.

Figure 13A:
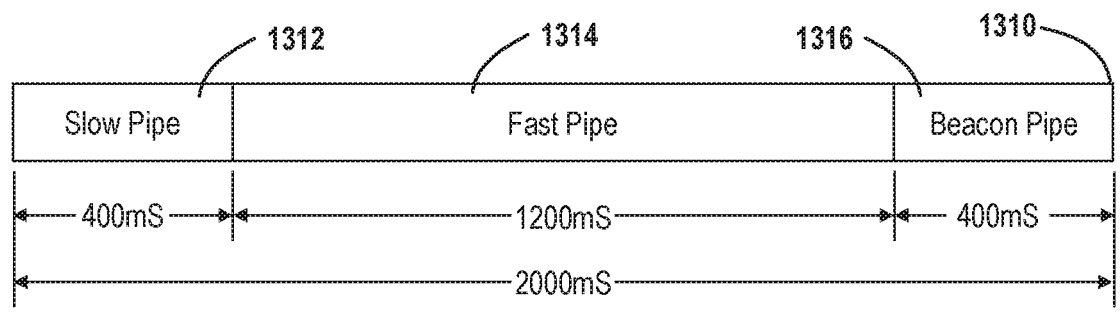
FIG. 13A is a diagrammatic representation of a timeslot.

Referring now to FIG. 13A, a timeslot 1310 is illustrated having a slow pipe 1312, a fast pipe 1314 and a beacon pipe 1316. The slow pipe, in this example, is 400 milliseconds. The fast pipe is 1200 milliseconds and the beacon pipe is 400 milliseconds. The overall timeslot is 2,000 milliseconds or 2 seconds. Each of the pipes 1312, 1316 is of a fixed duration and is always present within a frame. Each node has a guaranteed and uncontested period of time to transmit its assigned pipe within the timeslot.

Figure 13B:
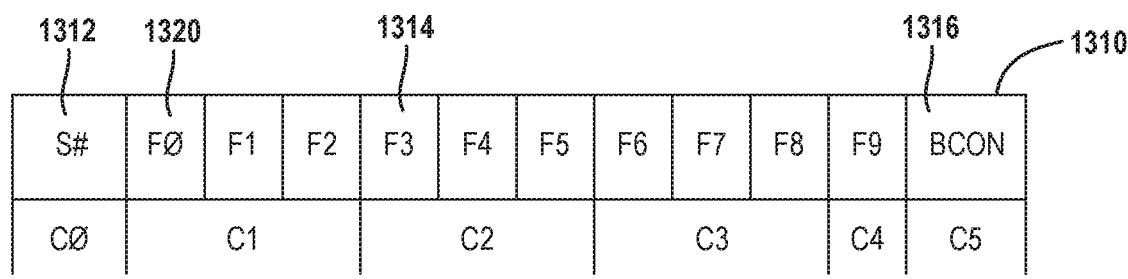
FIG. 13B illustrates the channel hopping frequencies relative to a time frame.

Referring now to FIG. 13B, the frame 1310 is illustrated with respect to the channel hopping frequencies. The number of channels hopped in each 2-second RF frame is 6. One frequency of 400 milliseconds in length is set for the slow pipe. The fast pipe 1314 is broken into 10 portions 1320 that correspond to each node. Therefore, in this example, the fast pipe has portions F0-F9. In this example, 3 fast pipe portions correspond to a frequency hop. Therefore, the fast pipe has 3 frequency hops C1, C2 and C3. The last fast pipe portion F9 (the tenth in this example) has a fourth channel C4. The beacon 1316 also has a corresponding channel hop frequency C5. Each channels dwell time is under the FCC limit of 400 milliseconds because the guard bands around the slot and the way the fast pipe is divided is in period of between 120 milliseconds and 360 milliseconds.

Figure 14:
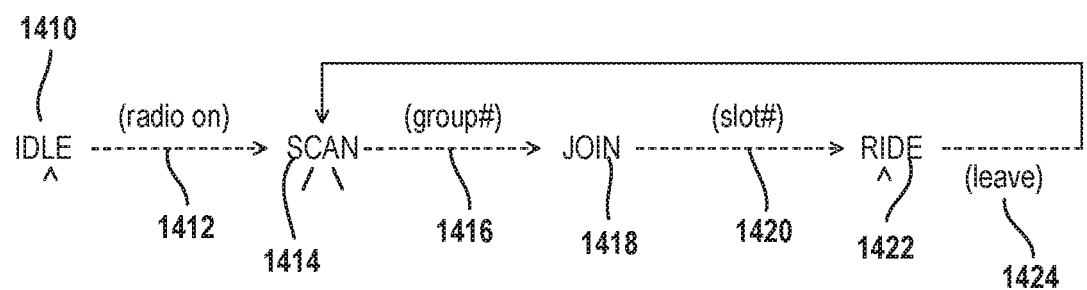
FIG. 14 is a diagrammatic view of the operation of the radio node.

Referring now to FIG. 14, the diagrammatic representation of a method of operating a radio is set forth. In state 1410, the radio is idle. In state 1412, the radio is turned on and a scan 1414 is performed. A group number 1416 may be assigned and the new or joining radio joins the group in 1418. A slot number 1420 is assigned to the radio. The system also includes a ride (or vehicle operation) mode at 1422 in which signals are exchanged during the designated timeslots per node. After riding or operating the vehicle is performed in 1422, a radio may leave the group in 1424. The group determines the channel hop table usage whereas the size is the maximum number of riders in the group. In some examples, size of the group may not be a factor. That is, the group may not have a maximum size. It should be noted that when group numbers are assigned, the master or leader of the group is assigned slot 0 as will be described in more detail below.

Figure 15:
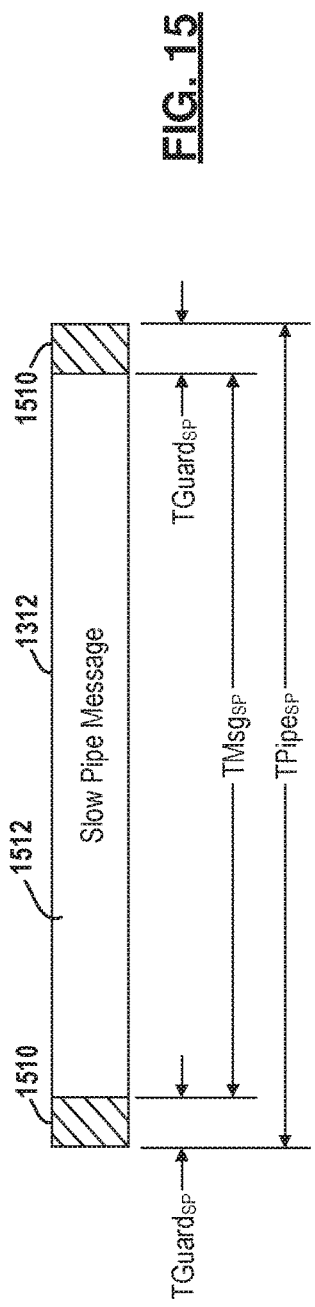
FIG. 15 is a diagrammatic view of a slow pipe message.

Referring now to FIG. 15, a slow pipe 1312 is illustrated having a guard time 1510 that shows both before and after a slow pipe message 1512. In this example, the slow pipe duration is 400 milliseconds while the slow pipe message duration is 382 milliseconds. Each guard time 1510 may be 9 milliseconds.

Figure 16A:
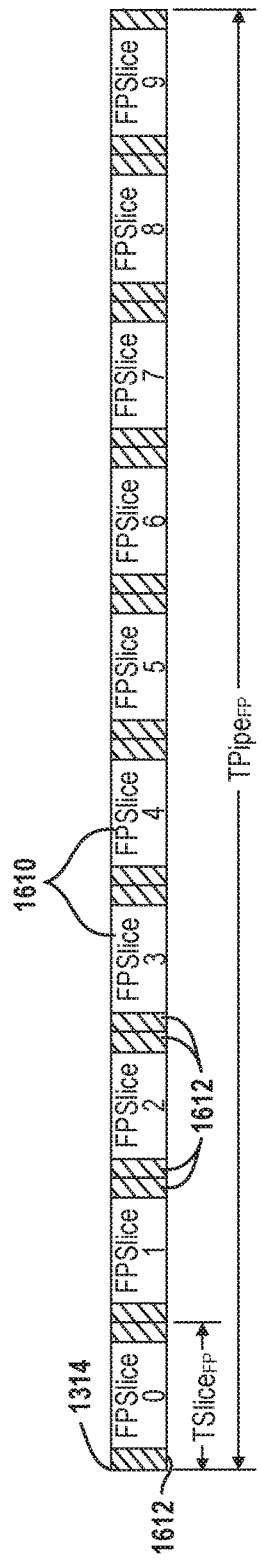
FIG. 16A is a diagrammatic view of a fast pipe having a plurality of slices therein.
Figure 16B:
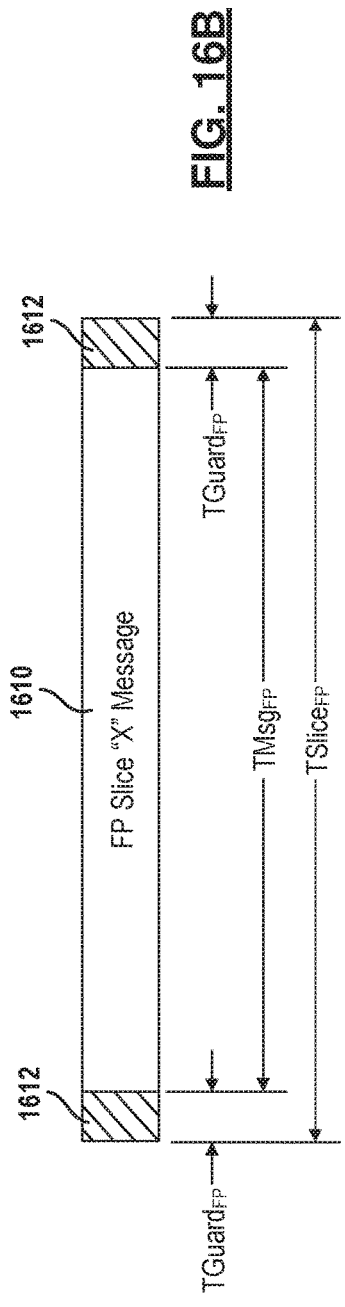
FIG. 16B is a diagrammatic view of a single slice.

Referring now to FIG. 16A, a fast pipe 1314 is illustrated with a plurality of slices 1610. The fast pipe 1314 is designated for fast speed and shorter range as compared to the slow pipe 1312. The fast pipe has 10 slices, each of which correspond to a respective node within the group. The lower latency of the fast pipe provides a higher speed. Each of the slices within the fast pipe includes a guard time 1612. Between each guard time, it is a fast pipe slice message 1620. The fast pipe duration is 1200 milliseconds. The fast pipe slice duration is 120 milliseconds. The fast pipe message duration is 101 milliseconds and the fast pipe guard time is 9.5 milliseconds in this example.

Figure 17A:
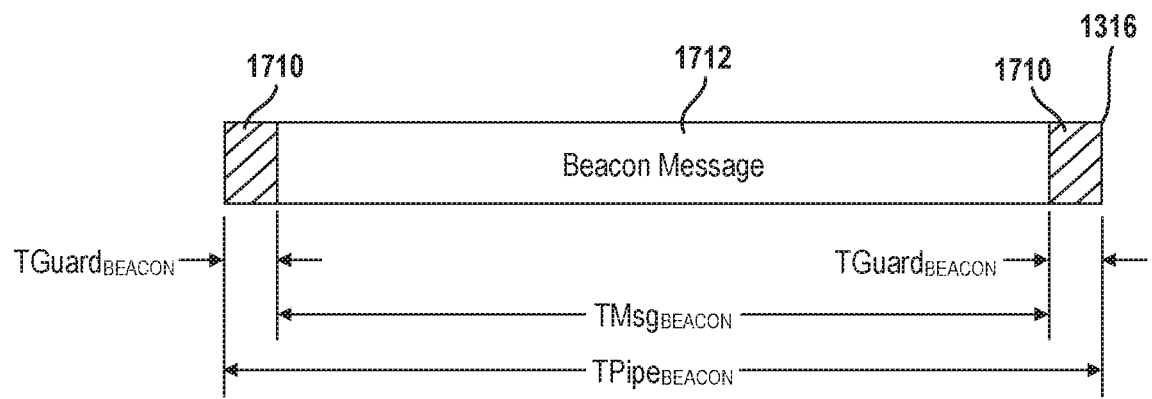
FIG. 17A is a diagrammatic view of a beacon message.
Figure 17B:
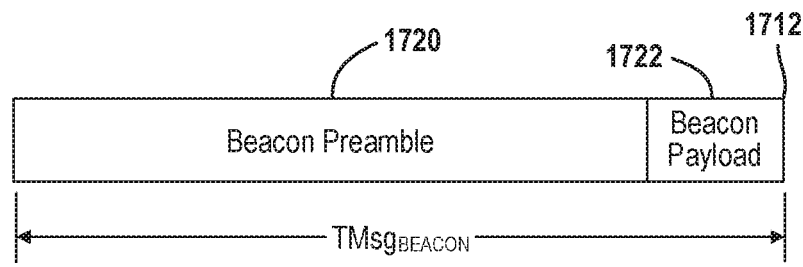
FIG. 17B is a diagrammatic view of the beacon message in the transmit form.

Referring now to FIGS. 17A and 17B, the beacon type 1316 is illustrated in detail. The beacon pipe contains beacon messages transmitted by the master radio or the radios of the group. The beacon messaging provides the joining data for unassociated nodes to find nearby groups. The beacon contains data about the groups so that unassociated nodes can join. As mentioned above, the duration of the beacon 1316 is 400 milliseconds. The guard portions 1710 are 10 milliseconds and the beacon message 1712 is 380 milliseconds. The beacon message 1712 has a beacon preamble 1720 and a beacon payload 1722. The beacon preamble 1720 and the beacon payload 1722 combine to about 380 milliseconds. During a beacon preamble 1724 allows for the carrier activity detection facility of the radio hardware to switch to the next frequency. All potential frequencies cannot be listened to within a single beacon pipe duration. However, in this example, three beacon pipe intervals allow all of the frequencies to be scanned.

Figure 17C:
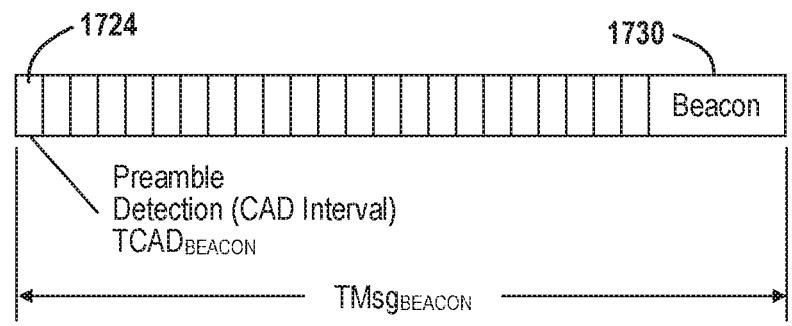
FIG. 17C is a diagrammatic view of a receive beacon message.

FIG. 17B is a transmit beacon whereas a receive beacon 1730 is set forth in FIG. 17C.

FIGS. 18A-18I contain various portions of a fast pipe, slow pipe and beacon pipe. The same data may be communicated in the fast pipe and slow pipe. The fast pipe may contain some additional data.

Figure 18A:
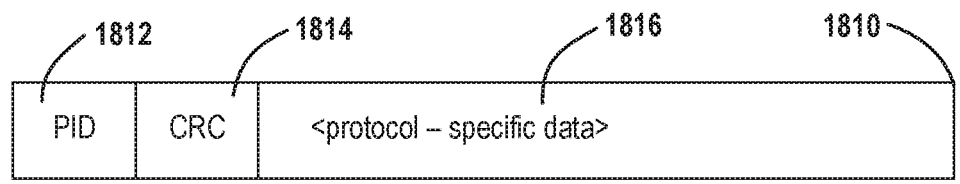
FIG. 18A is a diagrammatic representation of a packet communicated through the system.

Referring now to FIG. 18A, a packet 1810 used in the communication system each contain a protocol identifier byte (PID) 1812. Each packet may also contain a checksum such as a cyclical redundancy check byte 1814. Protocol specific data portion 1816 may also be included after the CRC packet. The protocol ID identifies the type of packet as the cyclical redundancy check helps determine errors.

Figure 18B:
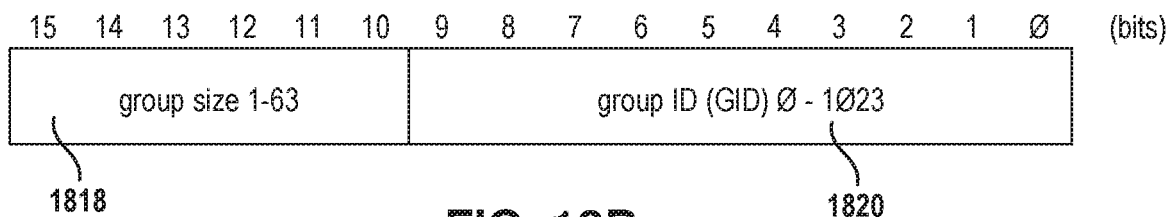
FIG. 18B is a view of a group size and group identifier parameter.

Referring now to FIG. 18B, a group ID packet may comprise a group size 1818 and a group identifier 1820. The group size 1818 may be 6 bits and ranges from 1-63. The group identifier may range from 0-1023 (10 bits). Together the group size and the group identifier are two bytes (16 bits). Group size may be an optional feature.

Figure 18C:
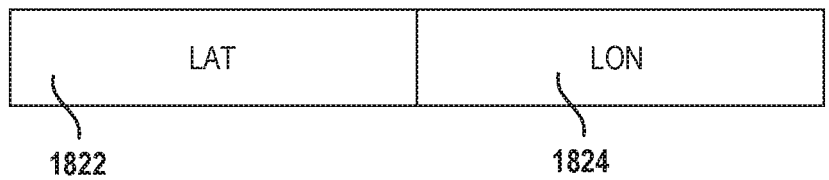
FIG. 18C is a diagrammatic view of the latitude and longitude packets.

Referring now to FIG. 18C, a GPS latitude and longitude may also be provided as a protocol specific data. A latitude portion 1822 and a longitude portion 1824 may include a total of 8 bytes.

Figure 18D:
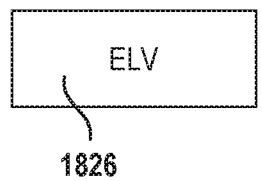
FIG. 18D is a diagrammatic view of an elevation packet.

Referring now to FIG. 18D, an elevation 1826 may also be provided. The elevation may be in meters and correspond to 2 bytes. The elevation data and the GPS data in FIGS. 18D and 18C, respectively, may be obtained from the GPS signal.

Figure 18E:
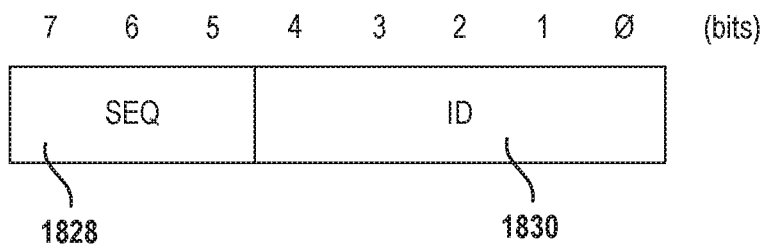
FIG. 18E is a diagrammatic view of a sequence and identifier message.

Referring now to FIG. 18E, a message identifier that may contain a text message for another radio is set forth. A sequence number that is used to display notifications is set forth as 3 bits in 1828. An identifier portion 1830 may have 4 or 5 bits and may indicate a type of data. For example, a zero in the identifier bit may indicate there is no message and thus is a placeholder. A placeholder may also default to communicating the last known position of the radio. An identifier of "1" may indicate an SOS and thus the vehicle may be prioritized. Other types of identifiers may also be provided.

Other types of data include speed with one byte of data, a fault code (crash, stall, battery), slot, color (for rely purposes set forth below), heading with one byte of data in degrees and a vehicle identifier that has three bytes and a cyclical redundancy check of 24. The vehicle identifier may be a vehicle identification number or some type of serial number.

Figure 18F:
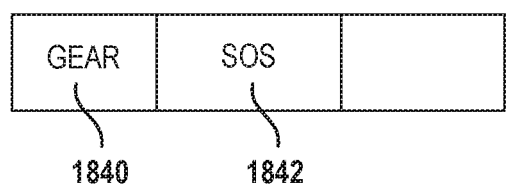
FIG. 18F is a diagrammatic view of vehicle information.

A vehicle information byte is illustrated in FIG. 18F. In this example, a gear portion 1840 may be used as all as a type portion 1842 for generating the gear the automatic transmission is in.

Figure 18G:
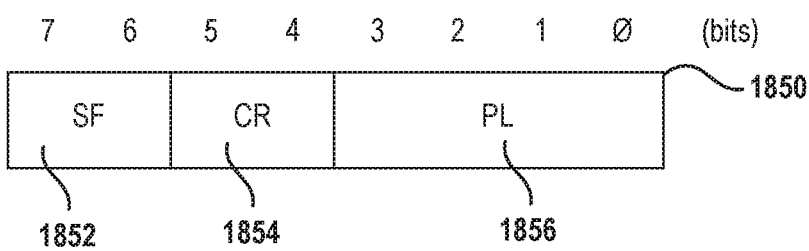
FIG. 18G is a diagrammatic view of a fast and slow pipe configuration data.

Referring now to FIG. 18G, a pipe configuration packet 1850 is set forth. In this packet, 8 bytes are used, 2 of which correspond to a spreading packet 1852, 2 bits correspond to a coding rate 1854 and 4 bits correspond to a payload size 1856. In this manner, the spreading factor, coding rate and payload size of each of the fast and slow pipe configurations may be communicated to the node radios.

Figure 18H:
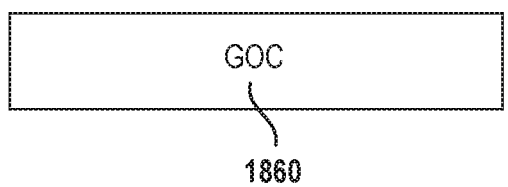
FIG. 18H is a diagrammatic view of a group occupation.

Referring now to FIG. 18H, a group occupation packet may be 4 bytes in communicating the occupied slots for the group.

Figure 18I:
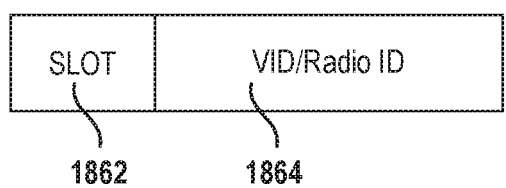
FIG. 18I is a diagrammatic representation of an acknowledge message.

Referring now to FIG. 18I, a group join acknowledge packet has a slot identifier with 1 byte in the slot portion 1862 and 3 bytes for the slot identifier 1864.

Figure 19A:
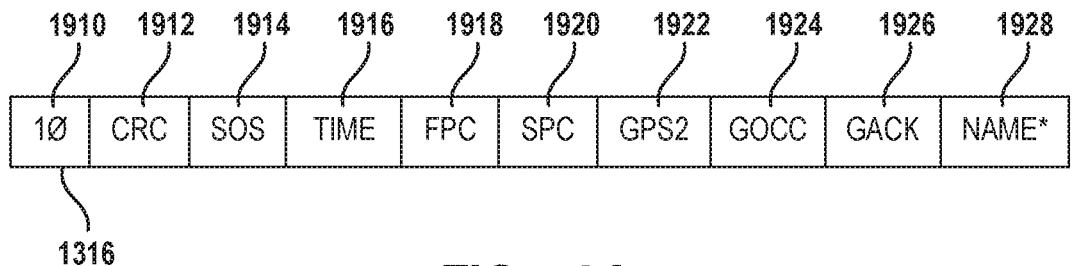
FIG. 19A is a diagrammatic view of a beacon packet.

Referring now to FIG. 19A, the beacon packet 1316 is set forth. In this representation of the beacon packet 1316, a protocol identifier (PID) in the protocol identification portion 1910 indicates the packet is a beacon packet. A cyclical redundancy check portion 1912 is set forth. A group identifier 1914, a time portion 1916, a fast pipe configuration portion 1918, a slow pipe configuration portion 1920, a GPS portion 1922, a group occupation portion 1924, a group acknowledge portion 1926 and a name portion 1928 may all be included therein.

Alternatively, a new group user may use group occupation information and choose a potential slot to use. As part of the joining operation, the user randomly listens to the chosen slot a small portion of the time. If the new user hears another radio in the chosen slot, then the new group user knows there is a conflict. The new group user then switches to another available slot, as determined by which slots they are receiving packets in. This listening and slot switching is an ongoing operation so no master is required to assign slots to riders.

Figure 19B:
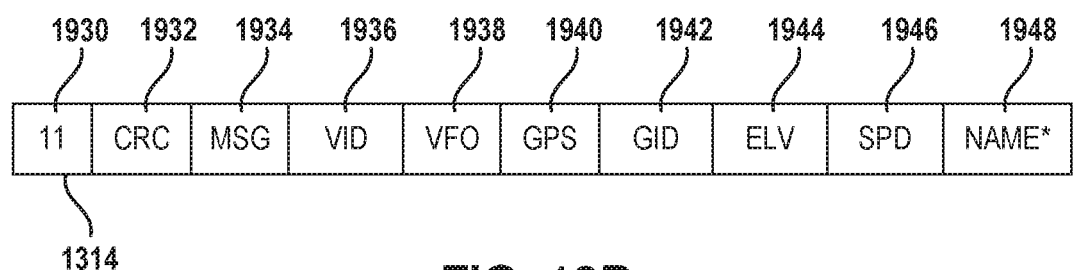
FIG. 19B is a diagrammatic view of a fast node packet.

Referring now to FIG. 19B, a protocol ID (PID) of 11 is set forth in the PID portion 1930. A CRC portion 1932 is also included therein. A message portion 1934, a vehicle identifier 1936, a vehicle information packet such as the gear and the SOS type 1938 is provided therein. A GPS portion 1940, a group identifier portion 1942, an elevation portion 1944, a speed portion 1946, a vehicle heading portion 1948 and a name portion 1950 may all be set forth in a fast node packet.

Figure 19C:
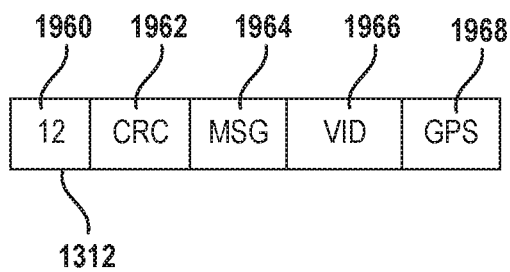
FIG. 19C is a diagrammatic view of a slow node packet.

Referring now to FIG. 19C, as mentioned above, the slow pipe packet may contain less data. In this example, a protocol identifier of 12 in the protocol identifier portion 1960 is the number 12 representing a slow node or slow pipe packet. A CRC is provided in portion 1962. A message portion 1964, a vehicle identifier portion 1966 and a GPS portion 1968 may all be included in the slow pipe packet 1312.

Figure 20:
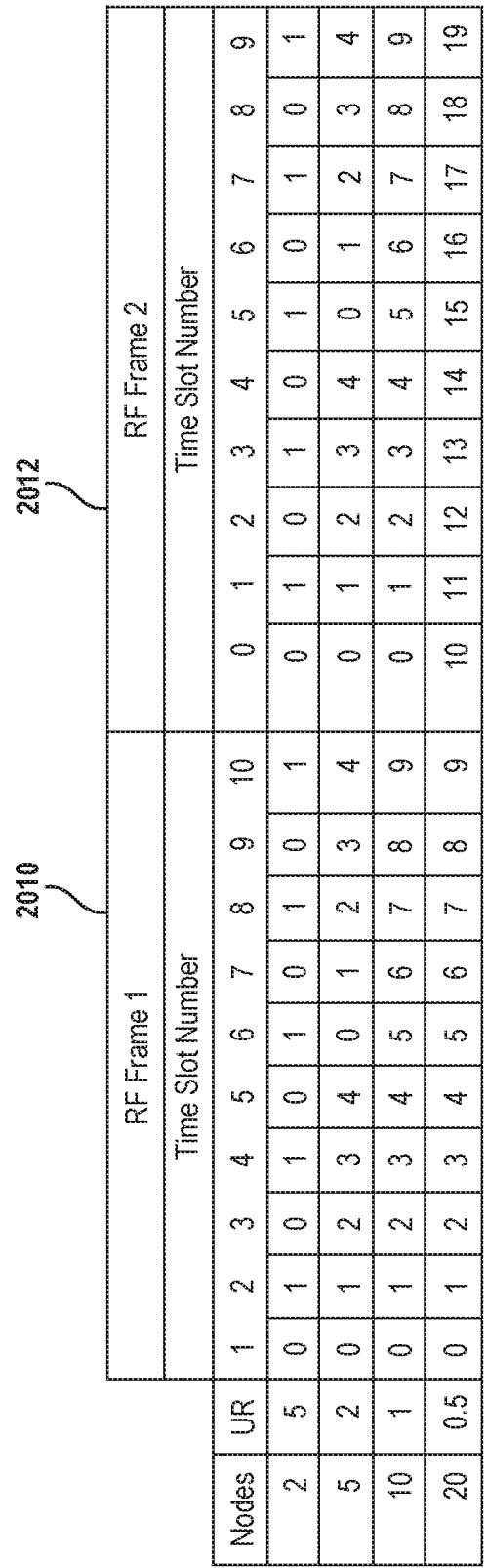
FIG. 20 is a table of timeslot usage versus a number of nodes.

Referring now to FIG. 20, a timeslot usage versus the number of nodes in a group is illustrated in the table. The table has a first RF frame 2010. A second RF frame is illustrated at 2012. The table shows the slow pipe usage for timeslots within an RF frame for various support group sizes. For example, 2 nodes, 5 nodes, 10 nodes and 20 nodes are all illustrated as the maximum number of nodes. In each timeslot node 0 corresponds to the master radio and the other numbers correspond to the node. In frame 1, every other timeslot corresponds to the first node. With 5 nodes, the nodes are used twice per RF frame. With 10 nodes, each nodes uses one of the ten timeslots. With 20 nodes, each of the timeslots of the first and second RF frame are used. The table also indicates the usage of slices within the fast pipe. That is, when viewed from the perspective of a slow pipe, only one slow pipe per timeslot is provided. The timeslots are all broken into slices in which the repetition rate for the various slices and the number of slices per timeslot is also indicated. That is, reference frame 1 and reference frame 2 may correspond to consecutive slices when referring to a fast pipe.

Referring now to FIG. 21A, the number of transmit events into an RF frame is set forth for the master radio and radios of other nodes. Once the group reference time, which corresponds to the time of group formation, is known and the current time from the GPS system, the number of transmit events that have elapsed since the group's formation for each node and therefore the current transmit frequency may be determined, an index into a frequency table offset may be used using the group reference time as the group offset and the node number as the second offset. The group offset lessens the likelihood that two groups have the same group number and collision frequency. The second offset reduces offset that a frequency jamming signal can corrupt all the node communications at a given time. When 2 nodes are used in the system, 10 slow pipe communications, 100 fast pipe communications may take place and 20 beacon communications may take place. When 5 maximum nodes are provided, 4 slow communications, 40 fast communications and 20 beacon communications may take place. With 10 maximum nodes, 2 slow communications, 20 fast communications and 20 beacon communications may take place. When 20 maximum nodes are provided in a system, 1 slow communication, 10 fast communications and 20 beacon communications may take place.

Alternatively, in a system with no master (all radios transmit beacons) the maximum number of transmit events the maximum will be the number for the master described above. However this number may be reduced.

Referring now to FIG. 21B, the transmit events in one RF frame for each of the either master node or the other nodes is set forth. As noted, the master node communicates both the beacon and data. With 2 maximum nodes, 65 transmission events and 55 transmission events for each node besides the master node take place. When 5 maximum nodes are provided within a system, 32 transmission events for the master and 22 for each other node are provided. When 10 is the maximum number of nodes, 21 master transmission and 11 transition events are formed. When 20 maximum nodes are provided is a system, 15.5 master transmission events take place while 5.5 individual node events take place. Of course, the tables set forth in FIGS. 21A and 21B may be derived from the timeslot usage illustrated in FIG. 20.

Figure 22:
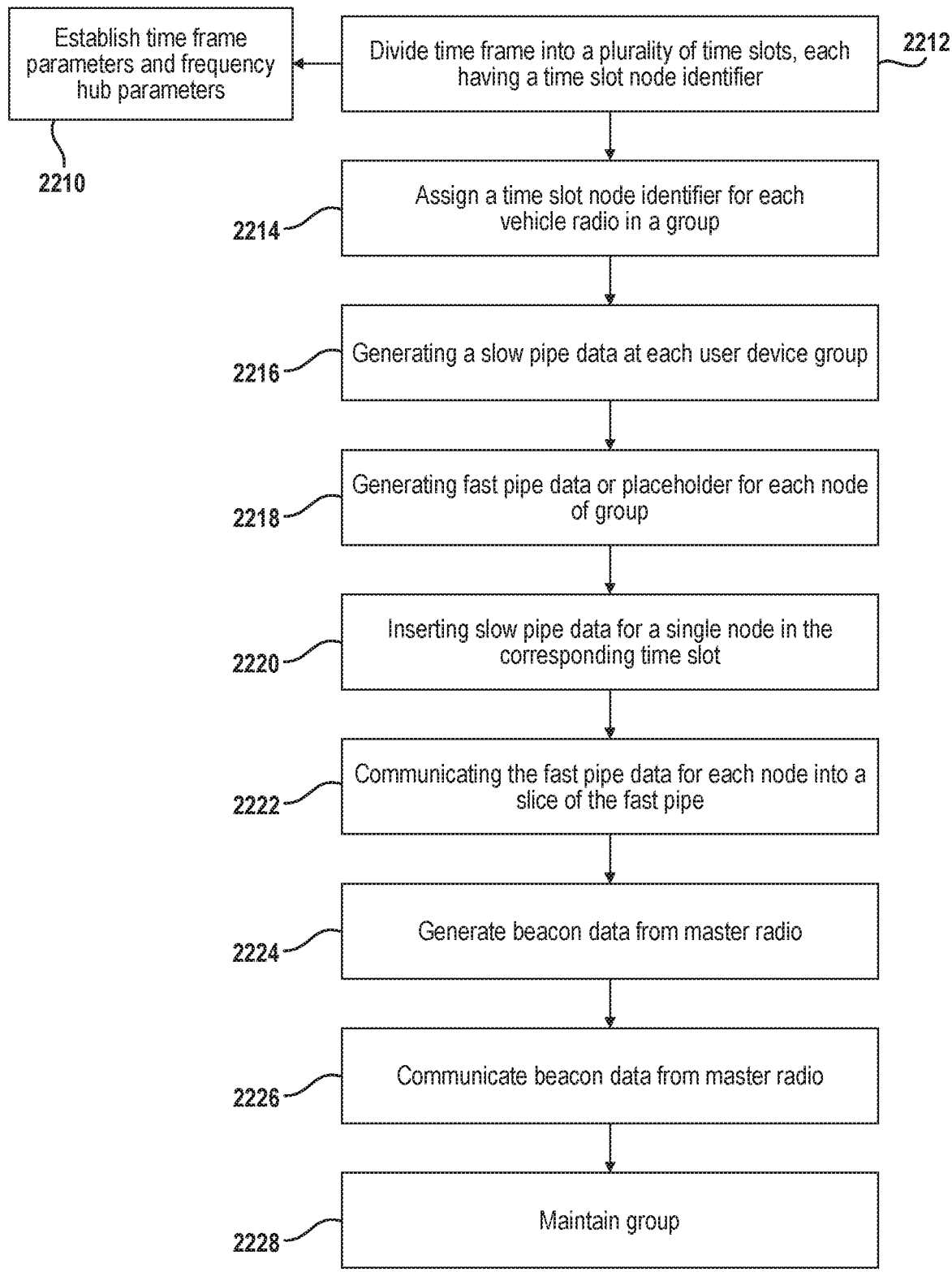
FIG. 22 is a flowchart of a method for establishing and communicating during various timeframes.

Referring now to FIG. 22, a method for forming communication signals corresponding to the above figures is set forth. In step 2210, the various types of time frame parameters are established including the frequency hop parameters and the time frame parameters such as the duration of the slow pipe, the duration of the fast pipe, the duration of each of the slices and the duration of the beacon pipe. In step 2212, the time frame is divided into the plurality of timeslots wherein each timeslot has a node identifier. As mentioned above, the node identifier corresponds to one of the plurality of audible nodes. In step 2214, the timeslot node identifier is provided for each vehicle radio in a group. When the timeslot node identifiers are assigned, unused timeslots are provided. In step 2216, a slow pipe data is generated for each user device of the group. In step 2218, the data is inserted into the single node corresponding to the timeslot. In step 2220, fast pipe data is generated for each of the nodes in the group. If fast pipe data is not desired to be transmitted by one of the nodes of the group, a placeholder may also be generated in step 2220. In step 2222, the fast pipe data or the placeholder data for each node is placed into the pipe in sequence that they were placed into the queue. That is, both the fast pipe and the slow pipe have a queue within the radio and thus the content to be provided within the fast pipe or slow pipe are communicated in order. In step 2224, beacon data is generated at the master radio. The beacon data may provide the various types of data illustrated in FIG. 18. In step 2226, the beacon data is communicated from the master radio.

In step 2228, the master radio maintains the group of radios within the group.

Figure 23:
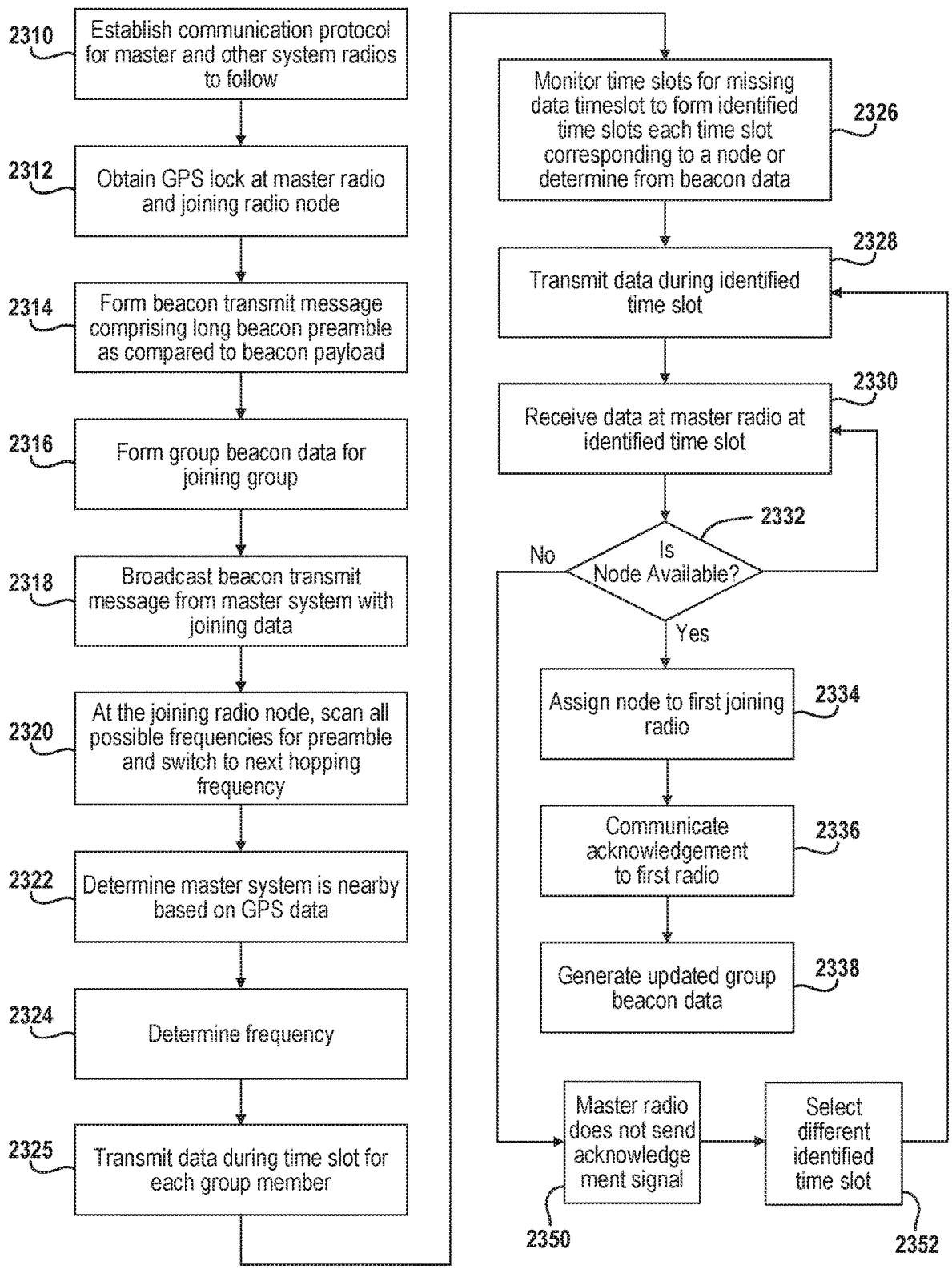
FIG. 23 is a flowchart of a method for transmitting data during the time joining a group.

Referring now to FIG. 23, a method for operating the system is set forth. In step 2310, the protocol for communicating between the master and other radio nodes is set forth. The protocols are set forth above in detail. In order for the master radio to operate and the other radios to operate that are within the nodes, step 2320 obtains a GPS lock at the master radio and any joining radio nodes. At step 2314, a beacon message is transmitted from the master radio. As mentioned above, the beacon transmit message comprises a relatively long preamble as compared to the beacon payload. In step 2316, the group beacon data for joining the group is provided. In FIG. 18, various types of data for joining the group including the group identifier and the user nodes are provided. In step 2318, the beacon transmit message is communicated from the master system with the joining data. In step 2320, the joining radio nodes scan all possible frequencies for the preamble and switches to the next hopping frequency. As mentioned above, this may be calculated based upon the joining data as described above in various places including with reference to FIGS. 21A and 21B.

Referring now to step 2322, it is determined at the joining node whether the master system is nearby. In the joining data, the GPS location of a master system is communicated. The location of the joining radio is also known. Therefore, if multiple group identifiers are obtained by the joining radio, the nearest group may be joined.

In step 2324, the time of the group formation and the current time is used to determine the number of transmit events so that the frequency hop may be determined based upon the joining data of the beacon. Another way to determine the frequency is using the group number and the GPS time. That is, the time of group formation may not be used. In step 2325, data is transmitted during the timeslot for each member of the group. In step 2326 the timeslots may be monitored for missing data for timeslots which are identified in the joining data. The master system may provide the used node identifiers. In step 2328, the data may be transmitted from the joining radio. The transmission of step 2328 is received at the master radio during the identified timeslot in step 2330. In step 2332, if the node is available, the timeslot is assigned to the joining or first radio in step 2334. In step 2336, an acknowledgement signal is communicated to the first radio and the group beacon data is updated in step 2338 to correspond to the node being used by the recently joined radio.

Referring back to step 2332, if the node is not available, step 2350 is performed in which the master radio does not send an acknowledgement signal and a different timeslot may be identified for the joining radio in step 2352. After step 2352, data may be transmitted again from the joining radio in step 2338.

Figure 24:
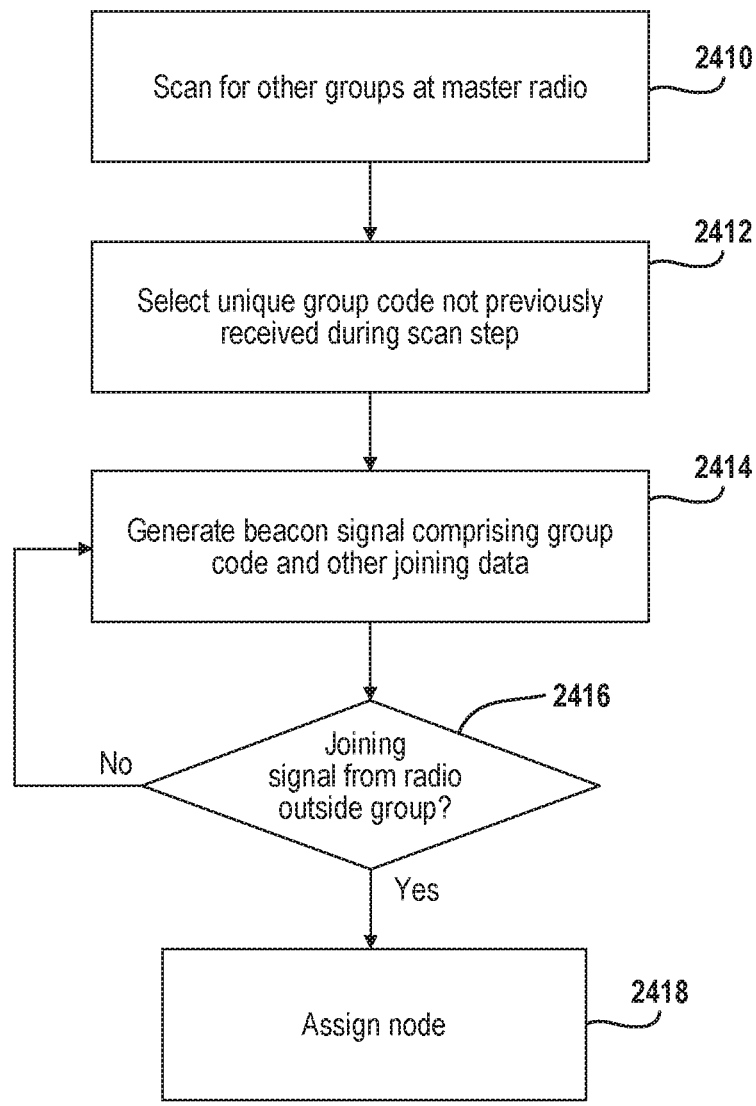
FIG. 24 is a flowchart of a method for forming a group from the perspective of the master radio.

Referring now to FIG. 24, a method for initiating a group from a master radio is set forth. In step 2410, a scan from the master radio is performed when a group is to be formed. This may take place after powering up the master radio. In step 2412, a unique group code that is not previously received during a scan step is performed. That is, in step 2410, the group identifiers for all adjacent groups capable of being received may be provided and monitored. In step 2412, a unique group not previously used is obtained. In step 2414, a beacon signal comprising the group code and other joining data is generated. In step 2416, if a joining signal from outside the radio group is formed, a node may be assigned in step 2418 as described above. In step 2416, when a radio signal is joined from within the group, the beacon data may continue to be communicated. In this manner, the master radio continually monitors for new signals that could potentially join the group.

Figure 25:
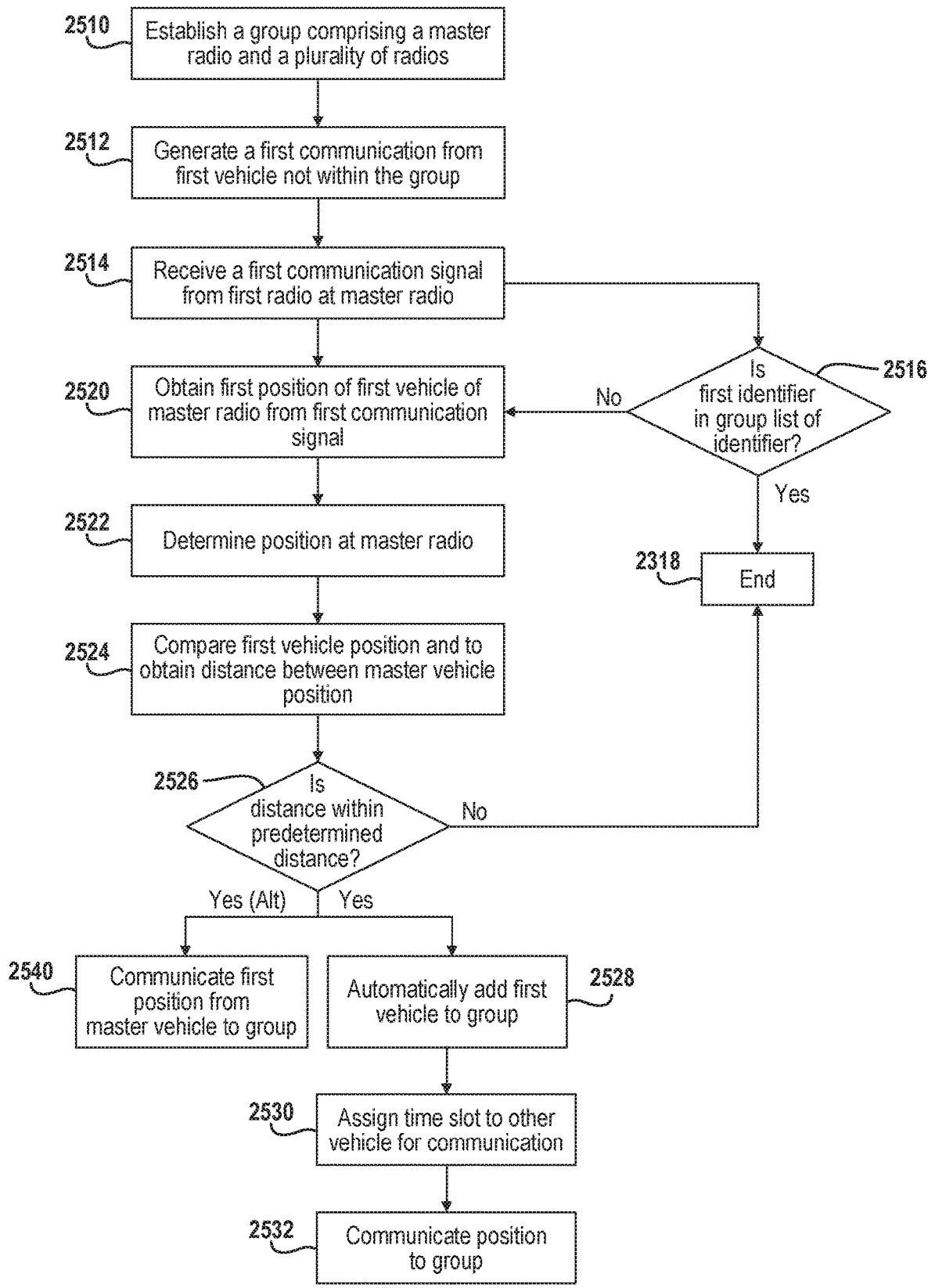
FIG. 25 is a flowchart of a method for entering a group automatically when a vehicle is close.

Referring now to FIG. 25, a joining radio that is not part of the group may join the group automatically when the radio is close by. In step 2510, a group is established with a master vehicle and a plurality of vehicles as described above. In step 2512, a first communication signal is generated from a first vehicle that is not within the group. In step 2514, the first communication signal from the first vehicle is received at the master vehicle. In step 2516, it is determined whether the identifier that is associated with the first communication signal is in a group list of identifiers. If the vehicle identifier from the first communication signal is in the first group, the process ends in step 2518.

Referring back to step 2516, if the vehicle identifier is not within a group list of identifiers at the master radio, step 2520 is performed. In step 2520, the first position of the first vehicle is obtained from the first communication signal. In step 2522, the position of the master radio is determined. Both step 2520 and 2522 may be performed using the GPS data received at each of the radios. In step 2524, the first vehicle position and the master vehicle position are compared in a comparing module to determine the distance therebetween. In step 2526, it is determined whether the distance between the two vehicles is within a predetermined distance. When the distance is not within a predetermined distance, meaning that the first vehicle and the master vehicle are far enough apart, the process ends in step 2518. After step 2526, if the distance is within a predetermined distance, step 2528 is performed which automatically adds the first vehicle to the group. In step 2530, a timeslot is assigned to the first vehicle for communication with the other vehicles. In step 2532, a position is communicated to the group using the timeslot of either the slow pipe or fast pipe. Referring back to step 2526, an alternative step compared to those of steps 2528-2532 may also be performed when the distance is within a predetermined distance. The master vehicle in step 2540 may communicate the position of the nearby vehicle to all the other vehicles. In this manner, the nearby vehicle does not necessarily have to join the group as set forth in steps 2528-2532.

Figure 26:
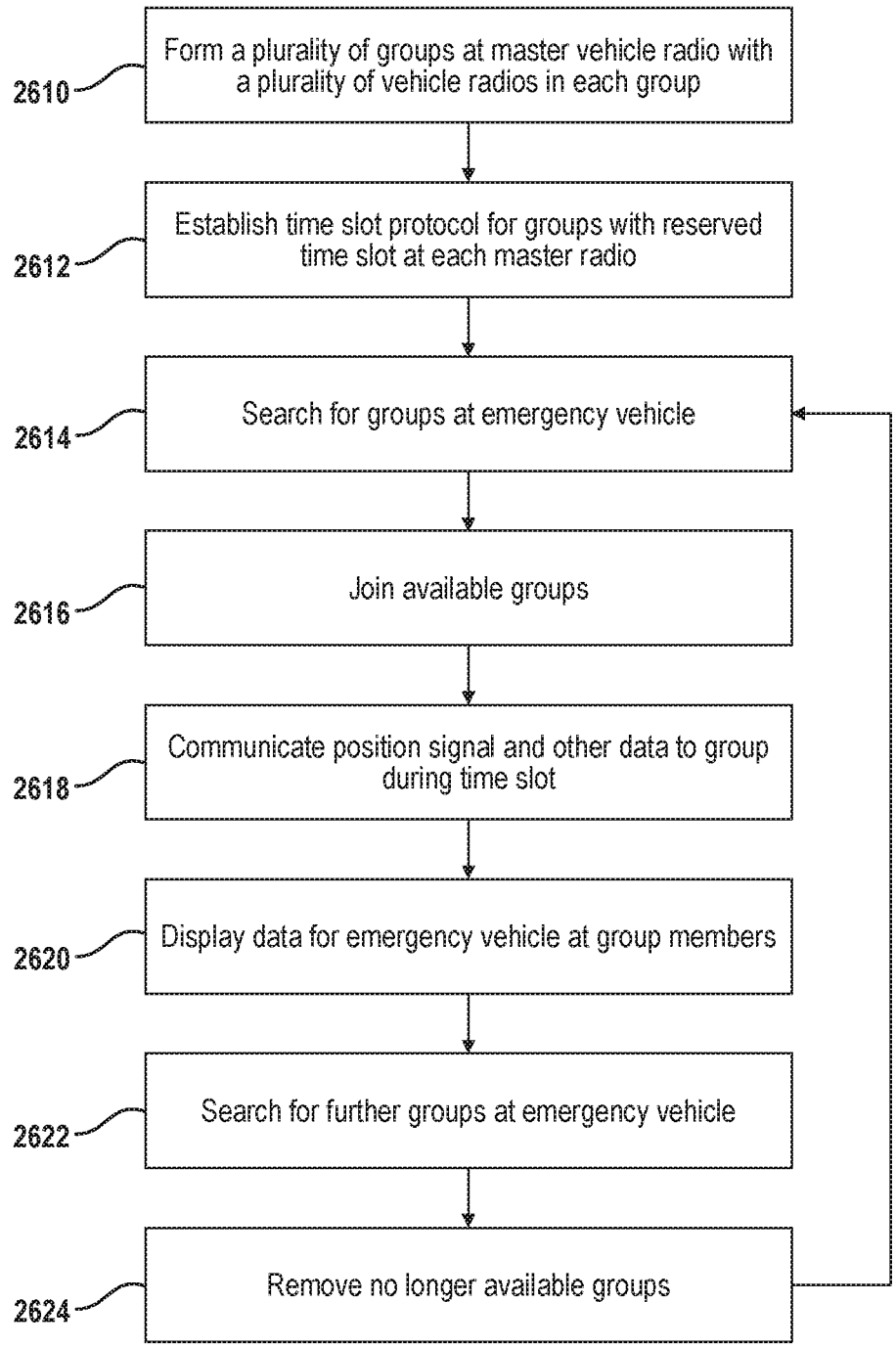
FIG. 26 is a flowchart of a method for operating an emergency vehicle communication system.

Referring now to FIG. 26, a method for handling emergency vehicles is set forth. In step 2610, a plurality of radio groups are formed at each master vehicle with a plurality of vehicle radios in each group. That is, a plurality of master vehicles may form a respective plurality of groups that do not intersect. Each radio may only be part of a single group. In step 2612, a timeslot protocol for the groups is established prior to forming the groups. Each master radio reserves a timeslot for emergency vehicles to communicate therethrough. In step 2614, groups are searched for at the emergency vehicle. In step 2616, the emergency vehicle joins each of the plurality of vehicles using the predetermined timeslot for communication therebetween. Should a conflict arise when transmitting, the closest group may be picked and alternated with during a conflicting timeslot. In step 2618, a position signal and other data may be communicated to the group or more than one group during the timeslot. A vehicle identifier such as the type of emergency vehicle as well as an emergency message may be communicated. For example, should the system be used for a snowmobile, a groomer message and speed may be communicated so that various vehicles may be warned of the position of a slow moving emergency vehicle.

In step 2620, a display may be generated at each of the group members that correspond to the emergency vehicle. The warning message may also be displayed.

In step 2622, the emergency vehicle may continue to scan for other nearby groups so that the emergency signals may be provided thereto.

In step 2624, when a group identifier is no longer received from another master because, for example, the master vehicle has extended beyond the RF range, the available group may no longer be communicated to during the timeslot associated with that particular group. Thus, available groups are removed in step 2624. After step 2624, step 2614 scans for other groups at the emergency vehicle.

Figure 27:
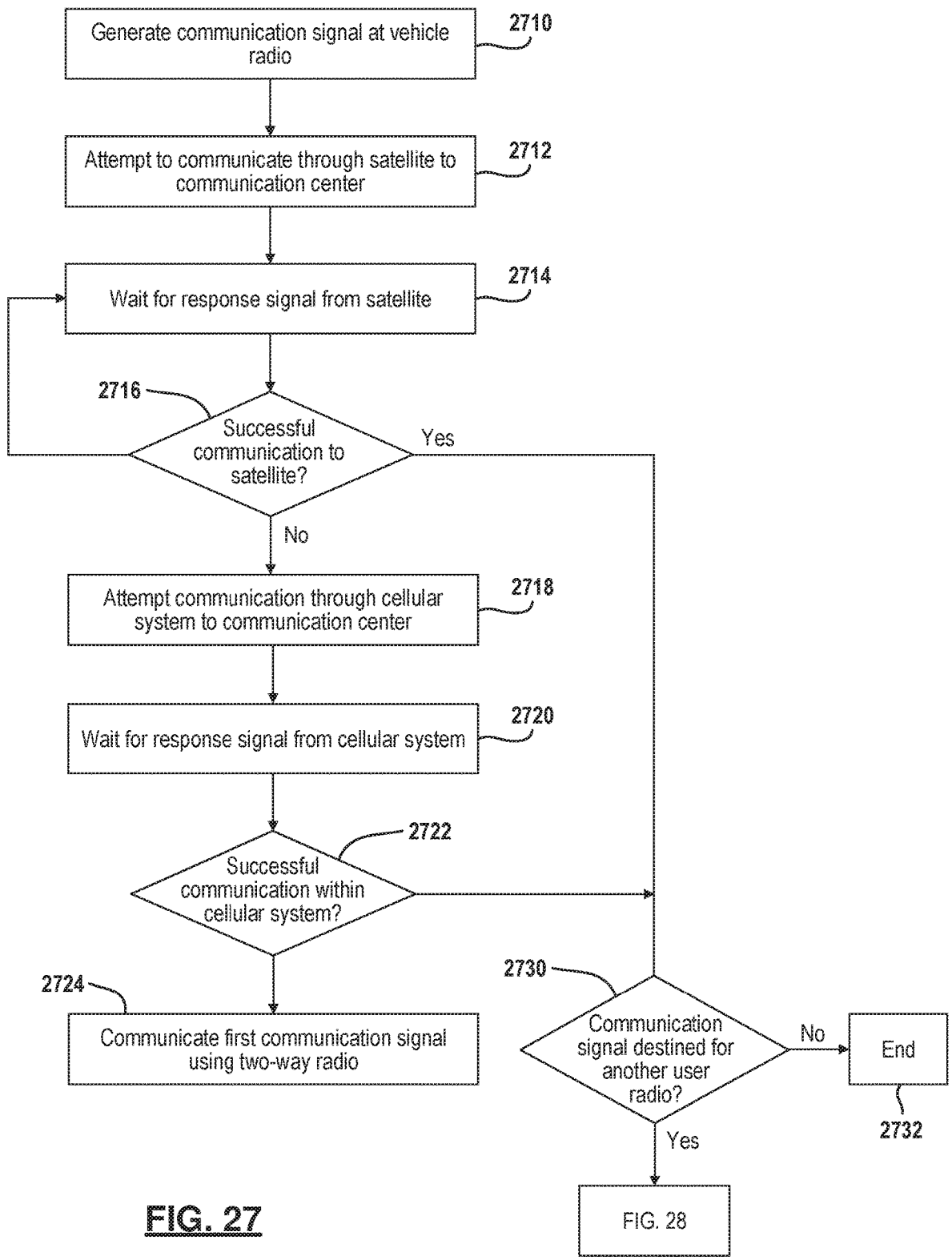
FIG. 27 is a method for communicating using a satellite communication system as a primary system with cellular and/or two-way radio communication as backup.

Referring now to FIG. 27, a method for using a satellite to communicate is set forth. As mentioned above, the satellite and satellite system are one example of a communication system. In step 2710, communication signals are generated at a vehicle radio. In step 2710, in an attempt to communicate through the satellite is provided. That is, a communication signal may be generated or communicated through an antenna of the vehicle radio. In step 2714, a response signal is expected at the vehicle radio that communicates in step 2712. However, after a certain amount of time, the response may not come. In step 2716, it is determined whether a successful communication was performed to the satellite. An acknowledgement signal may be communicated back to the vehicle radio to qualify the communication in step 2712 as successful. If the communication is not successful in step 2716, step 2718 attempts to communicate through the cellular system. In step 2720, a response from the cellular system is expected and therefore an amount of time may be weighted for by the system to determine whether the communication to the cellular system is successful. In step 2722, it is determined whether the communication with the cellular system is successful. As mentioned above, if an acknowledgement signal or another type of response signal is received, then the communication with the cellular system is successful. After step 2722 determines that the communication is not successful, step 2724 communicates the first communication signal with the two-way radio. In this manner, the cellular system may be used to backup the satellite system and the two-way radio system may be used to backup the cellular system. However, the vehicle-to-vehicle radio may also be used to backup the satellite system.

Referring back to steps 2716 and 2722, when the communication to the satellite is successful and whether communication to the cellular system was successful, step 2730 is performed. In step 2730, it is determined whether the communication signal is destined for another user. If no, the system ends in step 2732. If the signal was destined for another user radio, the system continues operation in FIG. 28.

Figure 28:
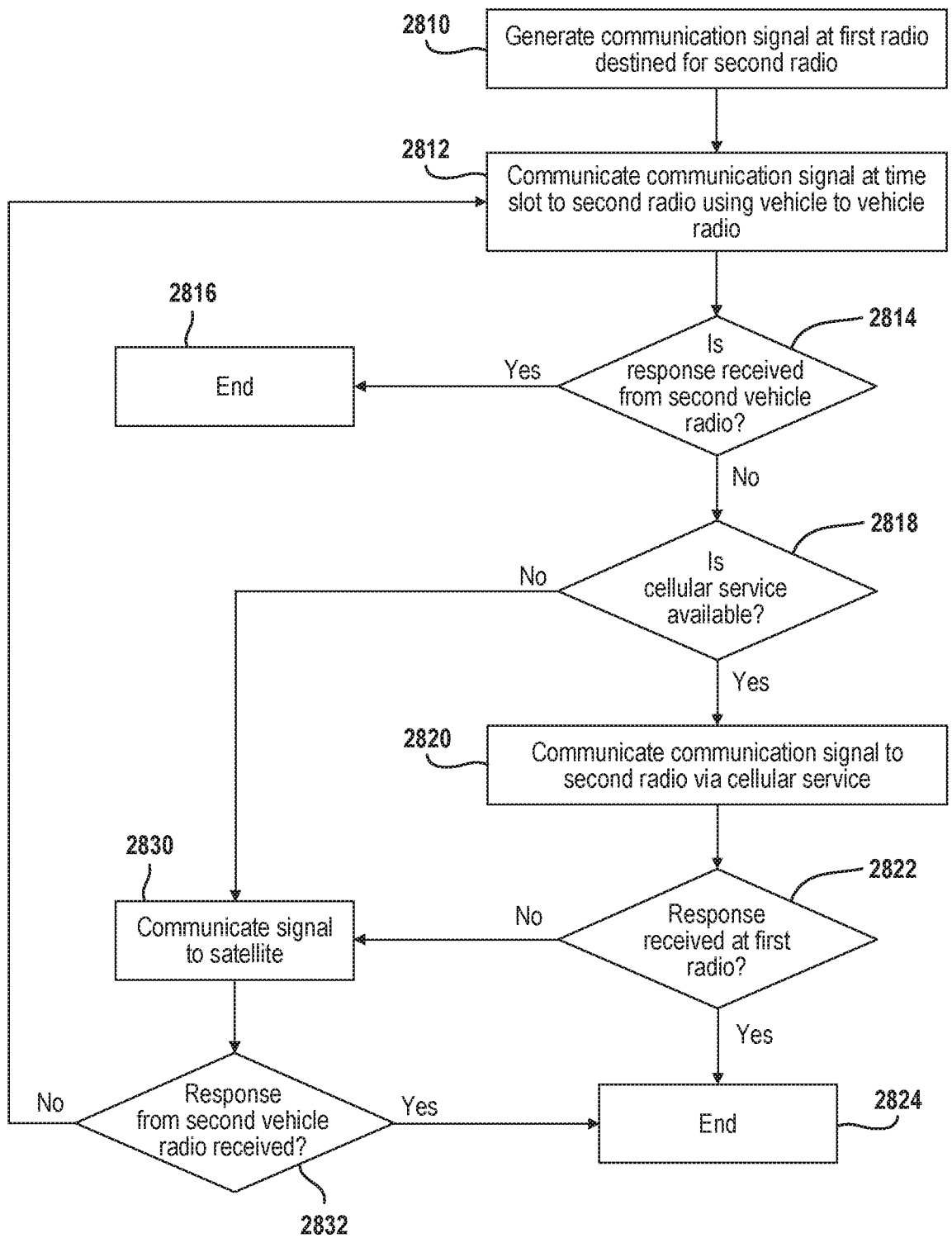
FIG. 28 is a flowchart of a method for communicating with a second vehicle radio.

In FIG. 28, step 2810 generates a communication signal at the first radio that is destined for a second radio. In step 2812, the communication signal is communicated from the first radio to a second radio using the vehicle-to-vehicle radio. In step 2814, it is determined whether a response is received from the second vehicle radio. If a response is received from the second vehicle radio, step 2816 ends the process. Referring back to step 2814, if no response is received from the second vehicle, step 2818 determines whether cell service is available. If the cell service is available, step 2820 communicates the signal to the cellular service. In step 2822, it is determined whether a response is received at the first radio. If a response is received, a successful communication has been performed and therefore the system ends the process in step 2824.

Referring back to 2822, if a response is not received from the cellular service, or in step 2818 if no cellular service is available, step 2830 communicates the signal to the satellite. If the satellite signal is successfully received, a response signal may be generated in a similar manner to that described above. After step 2830, step 2832 generates a response from the vehicle radio when a successful transmission is received. If no response from the second vehicle radio is received, step 2812 is then performed in which a communication signal is communicated during a timeslot. In step 2832, if a response is provided, step 2824 is again performed which ends the process.

Figure 29:
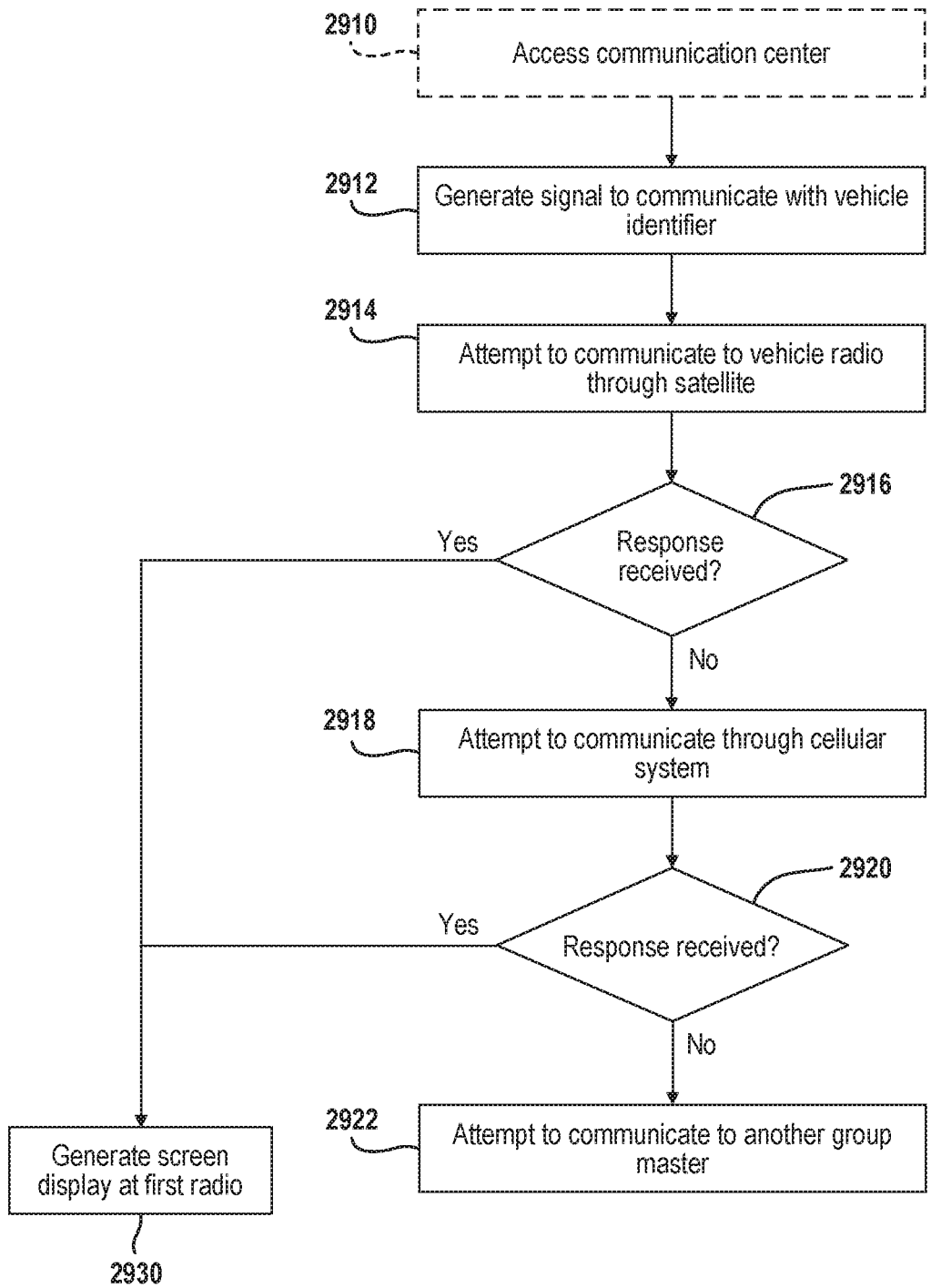
FIG. 29 is a flowchart of a method for using a cellular system and/or a satellite system as a backup to a vehicle-to-vehicle communication system.

Referring now to FIG. 29, in step 2910 communication with a communication center such as that illustrated in FIG. 1 may be performed. Access to the communication center may be obtained by outsiders wishing to communicate with people within the group through the internet or the like. In step 2912, a signal is communicated from the communication center with the vehicle identifier. The signal may not originate from the communication center but rather from various other places. In step 2914, an attempt to communicate to the vehicle radio through the satellite may be performed. In step 2916, if a response is not received, step 2918 attempts to communicate through the cellular system. After step 2918, step 2920 determines whether a response has been received from the cellular system. The response may be an acknowledgement signal or some other type of data signal. If a response is not received, the system attempts to communicate to another group member 22. In this manner, a mesh network may be formed between various vehicles in which one vehicle may relay communications from another vehicle or from another communication system.

Referring back to steps 2916 and 2920, if successful attempts are performed in communicating with the satellite in step 2916 or in communicating with the cellular system in step 2920, step 2930 may generate a screen display at the first radio indicative of the data received at the communication signal.

Figure 30:
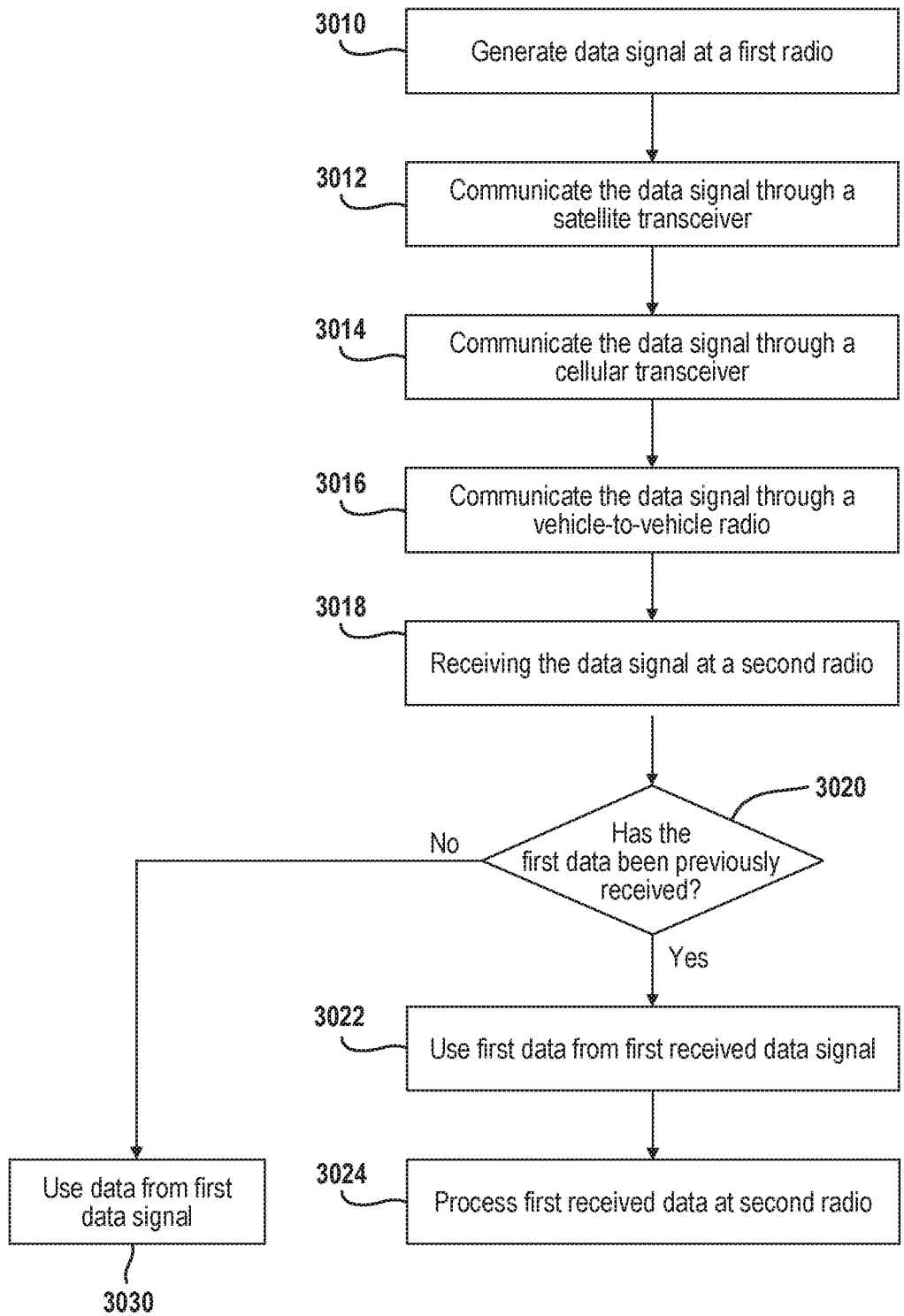
FIG. 30 is a flowchart of a method for preventing processing of redundant data.

Referring now to FIG. 30, a method for preventing multiple signals from being used at a receiving device is set forth. Instead of attempting communication as set forth in FIGS. 28 and 29, FIG. 30 allows the transmitting device to transmit the radio signals. The prevention of use of redundant signals is performed at the receiving device. In step 3010, data for a first communication signal is generated at a first radio. In step 3012, the communication signal is transmitted through a satellite transceiver of the first radio. In step 3014, the data signal is communicated through a cellular transceiver of the first radio. In step 3016, the data signal is communicated through the vehicle-to-vehicle radio according to the timeslot and node assignments as described above.

In step 3018, the data signal is received at a second radio. The data signal may be received through one of the communication system or multiple communication systems. That is, the receiving radio may receive the signal through a satellite transceiver, a cellular receiver, the vehicle-to-vehicle radio or one or more of the communication systems. In step 3020, it is determined whether the first data has been received through multiple communication systems. If the first data has been received through multiple communications, step 3022 uses the data from one of the received data signals. In a practical sense, the first data from the first received signal may be used and processed by the second radio in step 3024.

Referring back to step 3020, when the first data has not been received multiple times, step 3030 is performed. In step 3030, the data is used and processed from the first data signal.

Figures 31A, 31B:
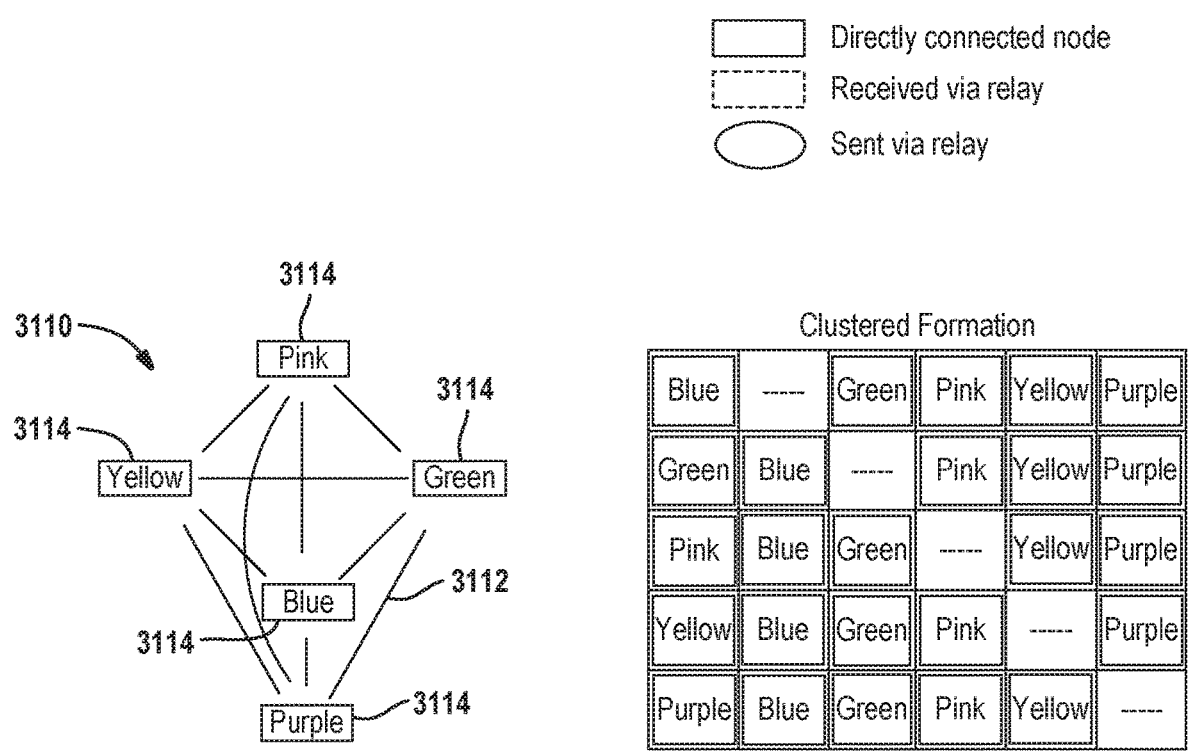
FIG. 31A is a diagrammatic view of a group of clustered nodes.
FIG. 31B is a relay table corresponding to the group of FIG. 31A.

Referring now to FIG. 31A, as mentioned above, with respect to the packet relay module 830 and the relay list of FIG. 8, the rider group may have a limited ability to communicate with all of the riders in the group due to the terrain and distances between the various members of the group. The member of the group, as mentioned above, are referred to as nodes. Each node corresponds to a communicating radio.

Relaying is used so that all of the nodes intercommunicate so that data may be exchanged between each of the nodes of the group. Relaying is performed by maintaining an array of other nodes with may be designated as active, inactive or relayed. Each node keeps track of which node's information it sits in in order to provide a relay to other nodes in need. Each node sends its array of nodes states in a summary form as part of its regular communications between the nodes. Other nodes are aware of the connectivity of the various nodes. In FIG. 31A, a clustered group 3110 is illustrated. The clustered group includes direct connections 3112 between the nodes 3114. The group 3110 is a clustered group which means that all of the nodes are within range of each other.

Referring now to FIG. 31B, the relay list is set forth in which the left column is the information or data for intercommunicating with other devices. For example, blue is directly connected to green, pink, yellow and purple. Green is directly connected to blue, pink, yellow and purple. Pink is directly connected to blue, green, yellow and purple. Yellow is directly connected to blue, green, pink and purple. Purple is directly connected to blue, green, pink and yellow. As is illustrated, no relaying of data takes place in the group 3110.

Figures 32A, 32B:
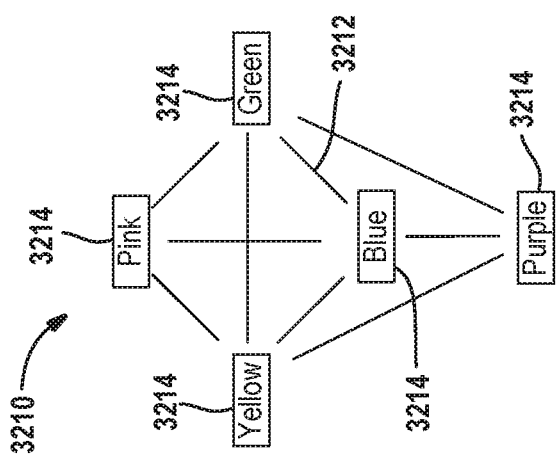
FIG. 32A is a diagrammatic view of a group of clustered nodes.
FIG. 32B is a relay table corresponding to the group of FIG. 32A.

Referring now to FIG. 32A, a group 3210 is set forth. In this group, the purple node moves out of range from the pink node 3214. All the nodes in FIG. 32A are labeled 3214. The direct connections 3212 are the same as those set forth in FIG. 31A except that a direct connection between the pink node and the purple node is no longer active. In this manner, the blue node relays the data between the pink and purple nodes. In this case, the blue node is considered the master node and forwards beacon data so that none of the other nodes needs to relay such as the yellow node or the green node.

Referring now to FIG. 32B, the interconnections relative to the colors are set forth. In this example, blue communicates with green, pink, yellow and purple. However, the blue node also communicates or relays data between the pink node and the purple node as indicated in the right-hand column of the chart. As noted, the blue node communicates directly with each of the other nodes.

The green node communicates directly with blue, pink, yellow and purple. Pink communicates directly with blue, green, yellow and, through a relay, with purple. Yellow communicates directly with blue, green, pink and purple. Purple communicates directly with blue, green and yellow. However, purple communicates via relay with the pink node.

Figures 33A, 33B:
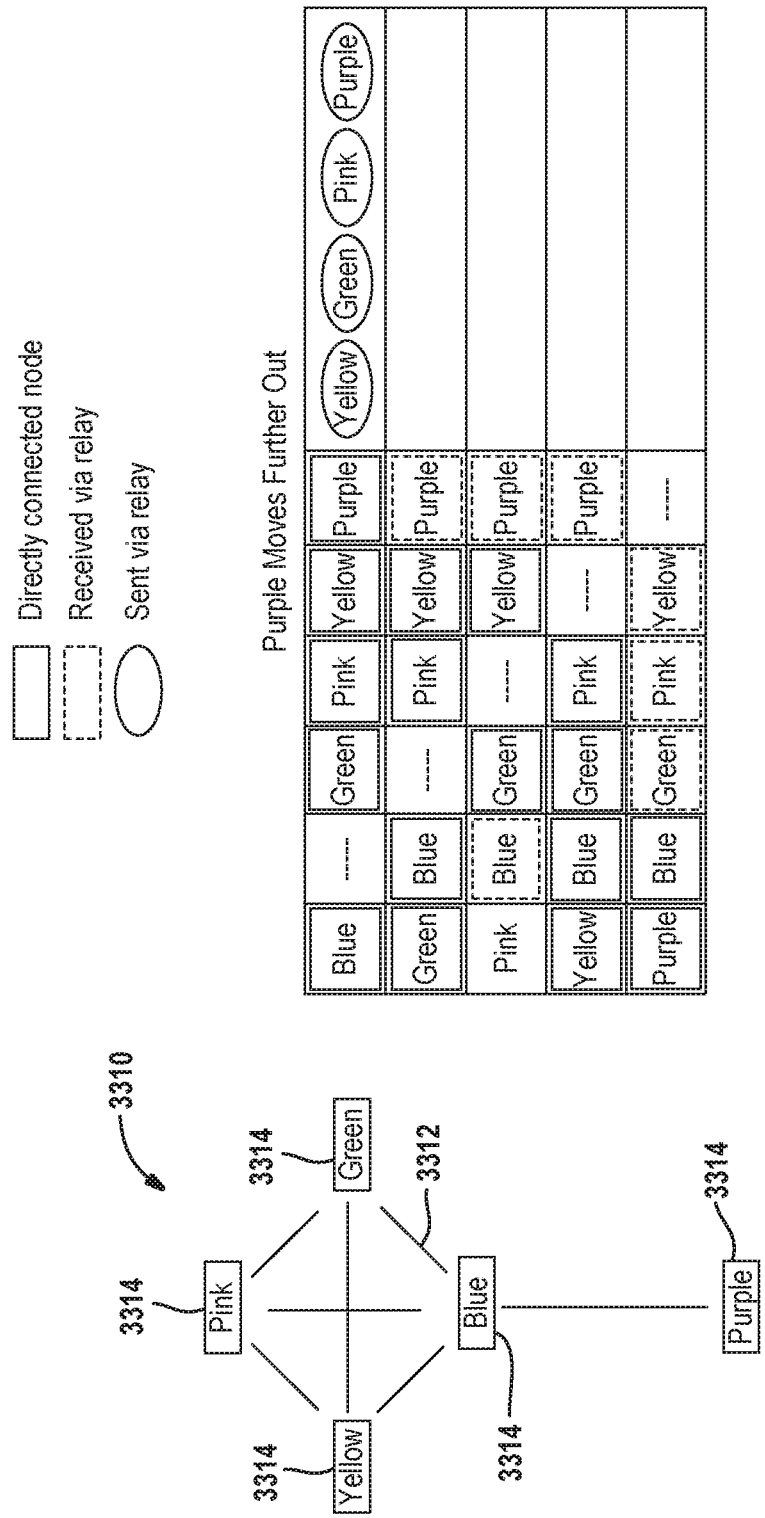
FIG. 33A is a diagrammatic view of a group of clustered nodes.
FIG. 33B is a relay table corresponding to the group of FIG. 33A.

Referring now to FIG. 33A, the configuration of FIG. 32A is changed by the purple node 3314 moving further away from the blue master node. The blue node now must forward all other nodes to the purple because purple cannot intercommunicate with any of the other nodes.

Referring now to FIG. 33B, the relay chart is illustrated. In the top row, blue communicates directly with all of the other nodes. However, the blue must relay communications from yellow, blue, pink and purple. Blue is the only node that has a direct connection to each of the other nodes.

Green communicates directly with blue, pink and yellow and via relay with purple. Pink communicates directly with blue, green, yellow and indirectly with purple through the relay of blue. Yellow communicates with blue, green, pink and indirectly with purple through the relay of blue. Purple communicates directly with blue and indirectly with green, pink and yellow through the relay of blue.

By the relay chart in FIG. 33B, yellow and green do not need to forward the purple data that was received from the blue because the yellow and green nodes see that the blue node sees all nodes needing purple already.

Figure 34B:
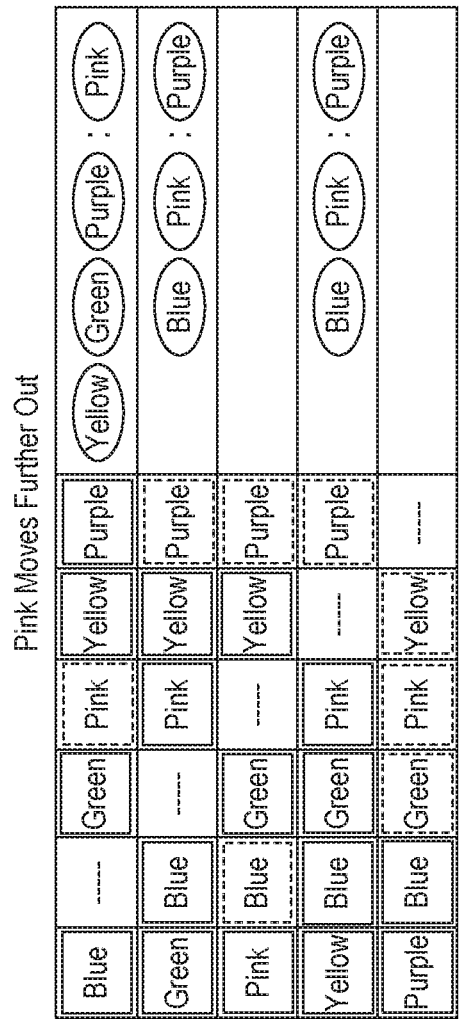
FIG. 34B is a relay table corresponding to the group of FIG. 34A.
Figure 34A:
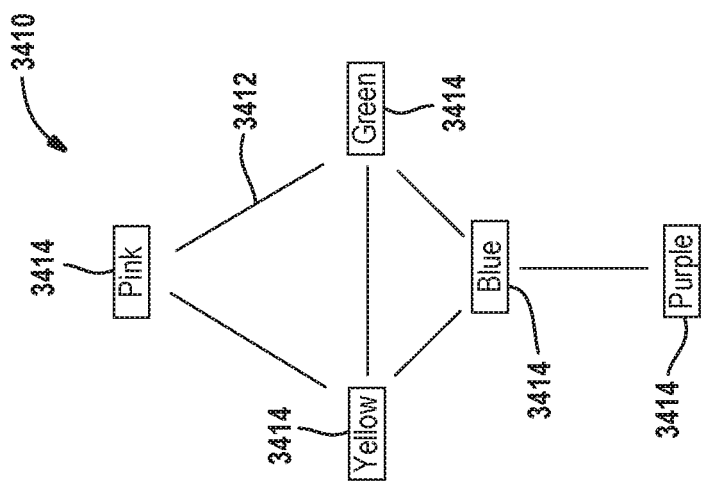
FIG. 34A is a diagrammatic view of a group of clustered nodes.

Referring now to FIG. 34A, the pink node 3414 moves a further distance from the blue node and therefore the pink node only directly communicates with the yellow and green nodes the only connection 3412 to pink is either yellow or green.

In the relay list illustrated in FIG. 34B, blue communicates directly with green, yellow and purple. However, blue communicates indirectly with pink. Blue relays yellow, green, purple and communicates via relay with pink. Yellow and green need to relay data between the pink and blue nodes. Blue needs to relay all other nodes including forwarding the pink node data.

The green node communicates directly with blue, pink and yellow and indirectly with the purple node through a relay with blue. The pink node can be relayed by the green node to purple.

Pink indirectly communicates with the blue node and the purple node and directly communicates with the green node and the yellow node. The yellow node communicates directly with the blue node, green node and pink node. The yellow node communicates indirectly with the purple node through the relay of blue. That is, in the right-hand column, blue communicates the pink node data with the purple node data.

Figures 35A, 35B:
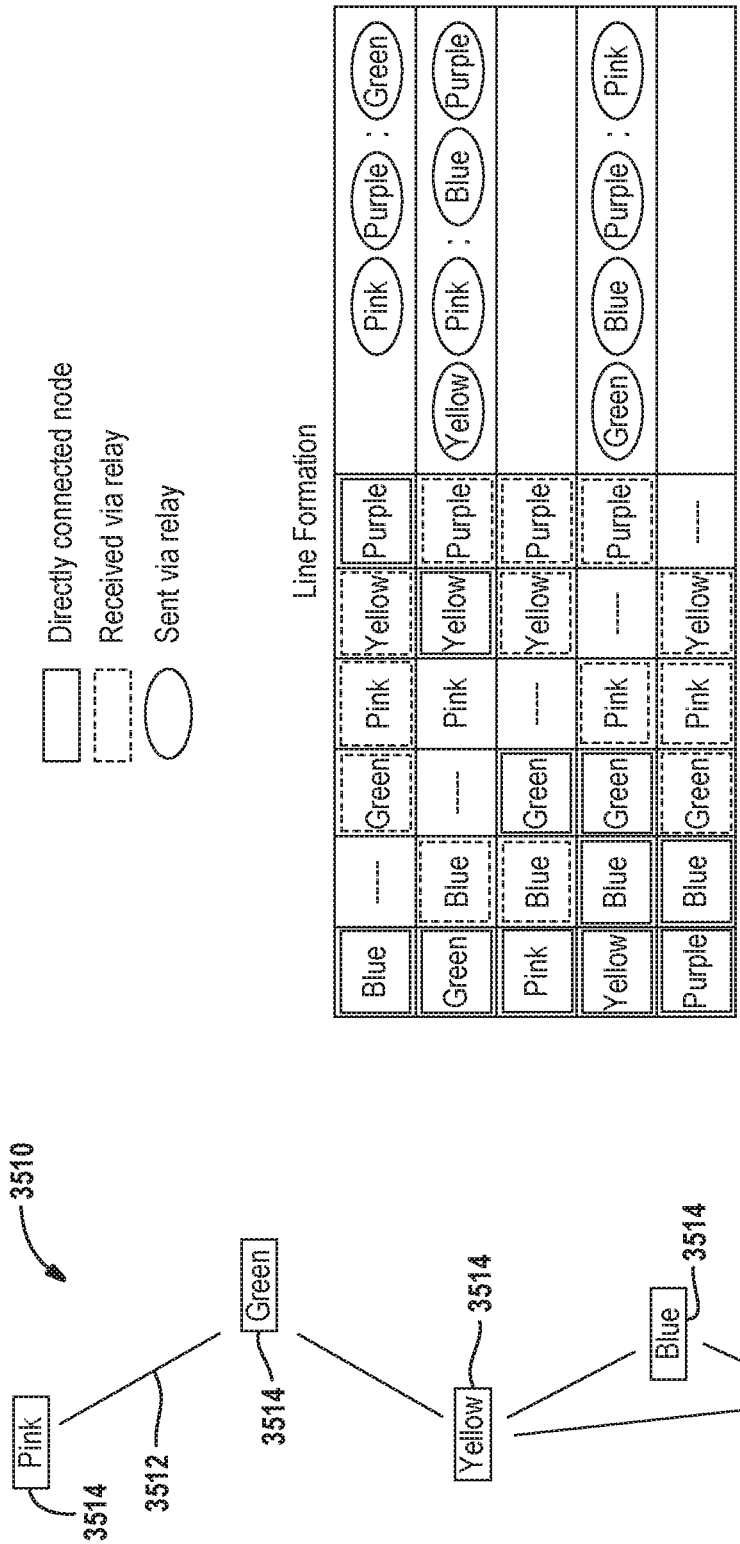
FIG. 35A is a diagrammatic view of a group of clustered nodes.
FIG. 35B is a relay table corresponding to the group of FIG. 35A.

Referring now to FIG. 35A, a cluster 3510 is more spread out in which a line formation is set forth for relaying and forwarding between nodes. In this example, blue does not relay yellow because it cannot tell that the other reachable node, purple, can see yellow already.

In this example, the only direct connection 3512 to pink is green and to green is yellow. The direction connections 3512 between yellow are purple and blue. The direct connections between purple are blue and yellow. Blue does not relay yellow because it can tell that the only other reachable node, purple, can see yellow already.

Referring now to FIG. 35B, blue is indirectly coupled to green and pink and directly coupled to yellow and purple. Blue is relay coupled to pink and couples purple to green. The green node is in direct communication with pink and yellow and indirectly with purple and blue. Yellow, pink, blue and purple are all available through relays.

Pink is in direct communication with green but is in indirect communication with blue, yellow and purple. Yellow is in direct communication with blue, green and purple. Yellow is in indirect communication with pink through green and relays blue, purple and pink data. Purple is in direct communication with blue and yellow and in indirect communication with green and purple.

Figures 36A, 36B:
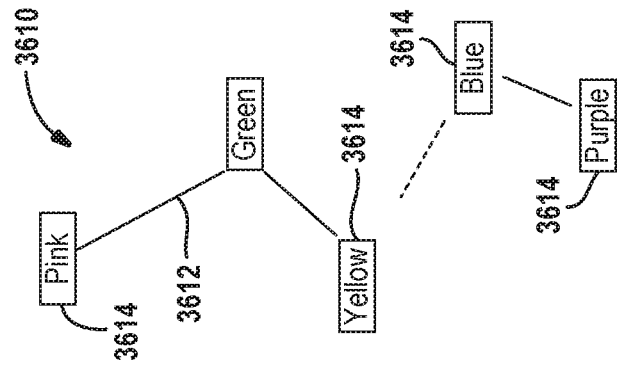
FIG. 36A is a diagrammatic view of a group of clustered nodes.
FIG. 36B is a relay table corresponding to the group of FIG. 36A.

Referring now to FIG. 36A, a disjoint formation is set forth. In this example, green may serve as a relay between pink and yellow while blue and purple are separate. The group 3610 thus has direct connections 3612 and is disjointed as indicated by the line 3620. Yellow and blue, if connected, would form a line and then a line formation would ensue and blue would relay purple and all nodes received from yellow such as green and pink and so on. In this example, blue is in direct communication with purple but is in indirect communication with green, pink and yellow should the connection be achieved. Blue must relay purple, yellow to pink and green.

Green is in direct communication with pink and yellow and in indirect communication with blue and purple. The disjoint nodes are pink and yellow and green is also in a line communication with the pink, yellow and blue and purple when blue is in communication with yellow.

Pink is in indirect communication with blue, yellow and purple and in direct communication with green. Yellow is in indirect communication with blue, pink and purple and in direct communication with green. The line under the blue connection indicates that the set is disjointed as indicated by the dashed line 3620.

Purple is in direct communication with blue and in indirect communication with green, pink and yellow.

Figure 37:
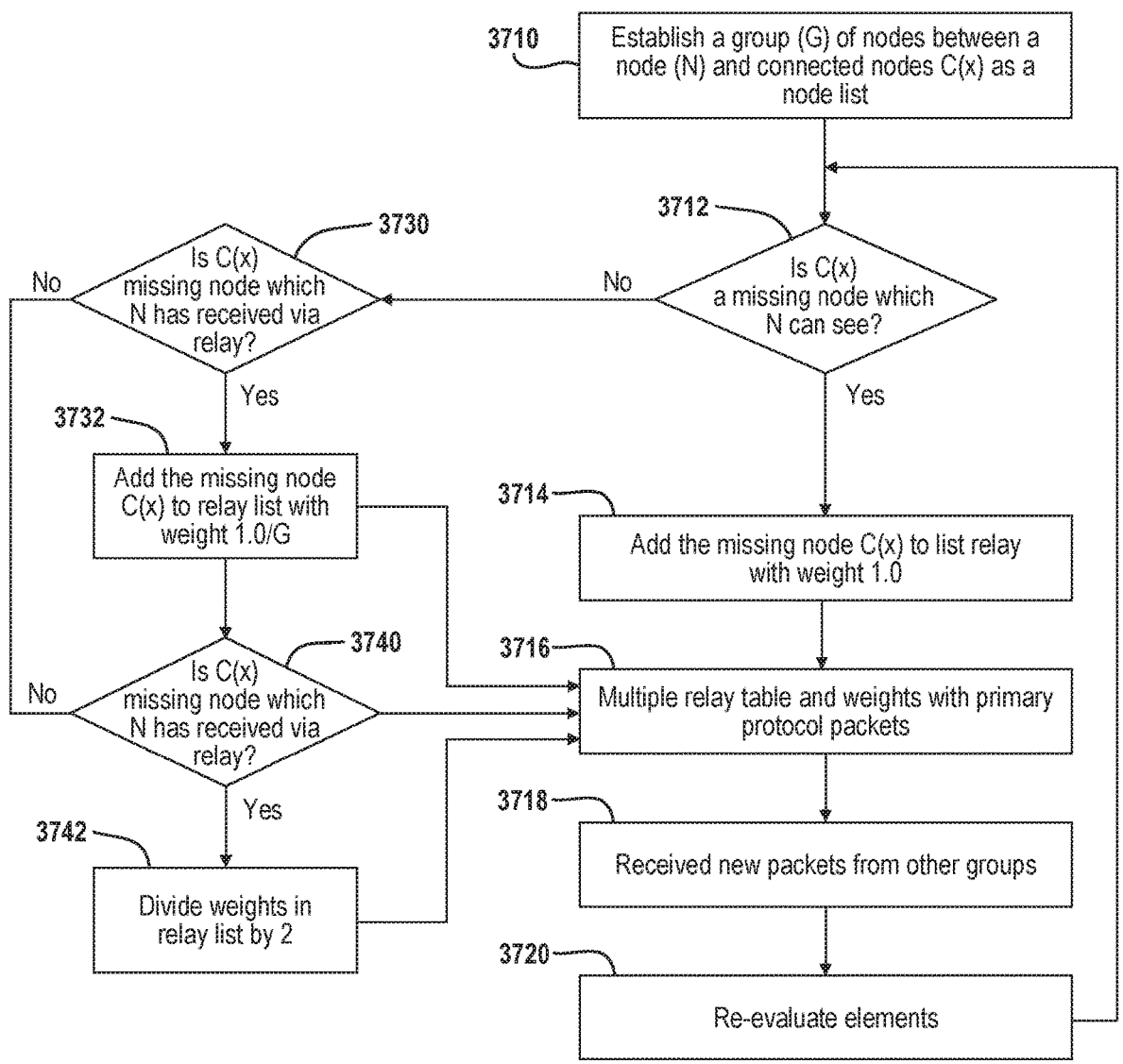
FIG. 37 is a flowchart for changing the relay list.

Referring now to FIG. 37, a flowchart of a method for maintaining the relay list illustrated above is set forth. In step 3710, a group (G) of nodes between a node N and connected nodes C(x) are formed as a nodes list. In step 3712, it is determined whether a node C(x) is a missing node which N can see. If the node C(x) is a missing node, then step 3714 is performed in which the missing node is added to the relay with a weight of 1.0. After step 2514, step 3716 multiplexes the relay table and the weights with the primary protocol packets. In step 3718, the packets are received from other groups. In step 3720, the elements and list within the relay list are reevaluated in step 3720 by restarting the process at step 3712.

Referring back to step 3712, when C(x) is not a missing node which N can see, step 3730 checks whether C(x) is a missing node which N has received via the relay. If the node is a missing node, step 3732 adds the missing node to the relay list with a weight of 1.0/G. After step 3732, steps 3716-3720 are performed.

Referring back to step 3730, if C(x) is not missing a node, step 3740 determines if the node is not equal to the master node (0), C(0) is not active and has elements in the relay list. If so, step 3742 divides the weights in the relay list by 2. After step 3740 determines whether the node is not equal to 0 and the C(0) is not active, steps 3716-3720 are again performed.

The above-disclosed cellular communication system, satellite control system, communication control system, user access system, service providers, advertisers, product and/or service providers, payment service providers and/or backend devices may include and/or be implemented as respective servers. The servers may include respective control modules for performing one or more of the corresponding tasks and/or functions disclosed herein.

The wireless communications described in the present disclosure with respect to Bluetooth transceivers of user receiving devices and mobile devices may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

A content or service provider is also described herein. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

While the following disclosure is made with respect to specific services and systems, it should be understood that many other delivery systems are readily applicable to disclosed systems and methods. Such systems include wireless terrestrial systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line communication systems, any point-to-point and/or multicast Internet Protocol (IP) delivery network, and fiber optic networks. None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method comprising:
   generating a first communication signal at a first radio of a first vehicle;
   attempting to communicate the first communication signal through a first communication system other than a vehicle to vehicle radio; and
   when an acknowledgement signal is not received at the first radio, communicating the first communication signal though the vehicle to vehicle radio to a second vehicle radio.

2. The method as recited in claim 1 wherein prior to attempting to communicate the first communication signal and after generating the first communication signal, and attempting to communicate the first communication signal though the first communication system, attempting to communicate the first communication signal through a second communication system.

3. The method as recited in claim 2 wherein the first communication system comprises a terrestrial communication system and the second communication system comprises an extraterrestrial communication system.

4. The method as recited in claim 2 wherein the first communication system comprises a satellite communication system and the second communication system comprises a cellular communication system.

5. The method as recited in claim 2 wherein the first communication system comprises an extraterrestrial communication system and the second communication system comprises a terrestrial communication system.

6. The method as recited in claim 2 wherein the second communication system comprises a satellite communication system.

7. The method as recited in claim 1 wherein the first communication system comprises a cellular communication system.

8. The method as recited in claim 1 wherein communicating the first communication signal comprises communicating the first communication signal from a vehicle-to vehicle radio through a fast pipe and a slow pipe.

9. The method as recited in claim 8 wherein first communication signal comprises a first identifier and a first position signal.

10. A system comprising:
    a first radio of a vehicle generating a first communication signal;
    said first radio attempting to communicate the first communication signal through a first communication system other than a vehicle to vehicle radio; and
    said first radio, when an acknowledgement signal is not received, communicating the first communication signal though the vehicle to vehicle radio to a second vehicle radio.

11. The system as recited in claim 10 wherein the first radio, prior to attempting to communicate the first communication signal, after generating the first communication signal, and prior to attempting to communicate the first communication signal though the first communication system, attempting to communicate the first communication signal through a second communication system.

12. The system as recited in claim 11 wherein the first communication system comprises a terrestrial communication system and the second communication system comprises an extraterrestrial communication system.

13. The system as recited in claim 11 wherein the first communication system comprises a satellite communication system and the second communication system comprises a cellular communication system.

14. The system as recited in claim 11 wherein the first communication system comprises an extraterrestrial communication system and the second communication system comprises a terrestrial communication system.

15. The system as recited in claim 11 wherein the second communication system comprises a satellite communication system.

16. The system as recited in claim 10 wherein the first communication system comprises a cellular communication system.

17. The system as recited in claim 10 wherein communicating the first communication signal comprises communicating the first communication signal from a vehicle-to vehicle radio through a fast pipe and a slow pipe.

18. The system as recited in claim 17 wherein first communication signal comprises a first identifier and a first position signal.

* * * * *